(12) United States Patent
Benitez et al.

(10) Patent No.: US 7,181,378 B2
(45) Date of Patent: Feb. 20, 2007

(54) COMPACT FOLDED-OPTICS ILLUMINATION LENS

(75) Inventors: Pablo Benitez, Madrid (ES); Juan C. Minano, Mardird (ES); Fernando Munoz, Mardird (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 143 days.

(21) Appl. No.: 10/779,259

(22) Filed: Feb. 13, 2004

(65) Prior Publication Data
US 2004/0252390 A1 Dec. 16, 2004

Related U.S. Application Data

(63) Continuation-in-part of application No. 10/269,479, filed on Oct. 11, 2002, now Pat. No. 6,896,381.

(51) Int. Cl.
| | |
|---|---|
| G06F 17/50 | (2006.01) |
| G06F 7/60 | (2006.01) |
| G06F 17/10 | (2006.01) |
| G02B 17/00 | (2006.01) |
| G02B 3/02 | (2006.01) |
| F21V 5/00 | (2006.01) |
| G05B 15/00 | (2006.01) |

(52) U.S. Cl. .............................. 703/2; 703/1; 359/728; 359/726; 359/718; 362/327; 700/98
(58) Field of Classification Search ............... 703/2, 703/1; 359/737, 708, 718, 726, 728; 362/327, 362/347; 700/98
See application file for complete search history.

(56) References Cited

U.S. PATENT DOCUMENTS

| | | |
|---|---|---|
| 1,399,973 A | 12/1921 | Limpert |
| 1,977,689 A | 10/1934 | Muller |
| 2,254,961 A | 9/1941 | Harris |
| 2,362,176 A | 11/1944 | Swanson |
| 2,908,197 A | 10/1959 | Wells et al. |
| 3,760,237 A | 9/1973 | Jaffe |
| 3,774,021 A | 11/1973 | Johnson |
| 3,938,177 A | 2/1976 | Hansen et al. |
| 4,188,111 A | 2/1980 | Marvin |
| 4,192,994 A | 3/1980 | Kastner |
| 4,211,955 A | 7/1980 | Ray |
| 4,337,759 A | 7/1982 | Popovich et al. |

(Continued)

FOREIGN PATENT DOCUMENTS

EP    0 450 560 A2    10/1991

(Continued)

OTHER PUBLICATIONS

Georg Glaeser, Hans-Peter Schrocker, "Reflections on Refaction" AMS, Sep. 5, 2001, pp. 1-18.*

(Continued)

*Primary Examiner*—Paul Rodriguez
*Assistant Examiner*—Dwin McTaggart Craig
(74) *Attorney, Agent, or Firm*—Thomas F. Lebens; Sinsheimer Juhnke Lebens & McIvor LLP

(57) ABSTRACT

The present embodiments provide for apparatuses, and methods for manufacturing apparatuses to convert a first distribution of an input radiation to a second distribution of output radiation. The apparatus can be defined in some embodiments by generating a two-dimensional representation of three active optical surfaces including calculating a segment of first, entry and second surfaces based on first second, and third generalized Cartesian ovals, respectively, and successively repeating the calculating of the segments of the first and second surfaces, and rotationally sweeping the two-dimensional representation about a central axis providing a three-dimensional representation. In some embodiments, portion of the first and/or second surfaces can be totally internally reflective.

11 Claims, 17 Drawing Sheets

U.S. PATENT DOCUMENTS

| | | |
|---|---|---|
| 4,342,908 A | 8/1982 | Henningsen et al. |
| 4,384,769 A | 5/1983 | Brei et al. |
| 4,388,673 A | 6/1983 | Maglica |
| 4,464,707 A | 8/1984 | Forrest |
| 4,638,343 A | 1/1987 | Althaus et al. |
| 4,675,725 A | 6/1987 | Parkyn |
| 4,698,730 A | 10/1987 | Sakai et al. |
| 4,727,289 A | 2/1988 | Uchida |
| 4,727,457 A | 2/1988 | Thillays |
| 4,920,404 A | 4/1990 | Shrimal et al. |
| 5,055,892 A | 10/1991 | Gardner et al. |
| 5,140,220 A | 8/1992 | Hasegawa |
| 5,302,778 A | 4/1994 | Maurinus |
| 5,335,157 A | 8/1994 | Lyons |
| 5,343,330 A | 8/1994 | Hoffman et al. |
| 5,404,282 A | 4/1995 | Klinke et al. |
| 5,404,869 A | 4/1995 | Parkyn, Jr. et al. |
| 5,438,453 A | 8/1995 | Kuga |
| 5,452,190 A | 9/1995 | Priesemuth |
| 5,453,877 A | 9/1995 | Gerbe et al. |
| 5,528,474 A | 6/1996 | Roney et al. |
| 5,557,471 A | 9/1996 | Fernandez |
| 5,577,492 A | 11/1996 | Parkyn et al. |
| 5,580,142 A | 12/1996 | Kurematsu et al. |
| 5,600,487 A | 2/1997 | Kiyomoto et al. |
| 5,608,290 A | 3/1997 | Hutchisson et al. |
| 5,613,769 A | 3/1997 | Parkyn et al. |
| 5,655,830 A | 8/1997 | Ruskouski |
| 5,655,832 A | 8/1997 | Pelka et al. |
| 5,676,453 A | 10/1997 | Parkyn, Jr. et al. |
| 5,699,186 A | 12/1997 | Richard |
| 5,757,557 A | 5/1998 | Medvedev |
| 5,777,433 A | 7/1998 | Lester et al. |
| 5,806,955 A | 9/1998 | Parkyn, Jr. et al. |
| 5,813,743 A | 9/1998 | Naka |
| 5,865,529 A | 2/1999 | Yan |
| 5,894,195 A | 4/1999 | McDermott |
| 5,894,196 A | 4/1999 | McDermott |
| 5,897,201 A | 4/1999 | Simon |
| 5,898,267 A | 4/1999 | McDermott |
| 5,898,809 A | 4/1999 | Taboada et al. |
| 5,924,788 A | 7/1999 | Parkyn |
| 5,926,320 A | 7/1999 | Parkyn et al. |
| 5,966,250 A | 10/1999 | Shimizu |
| 6,019,493 A | 2/2000 | Kuo et al. |
| 6,030,099 A | 2/2000 | McDermott |
| 6,044,196 A | 3/2000 | Winston et al. |
| 6,048,083 A | 4/2000 | McDermott |
| 6,097,549 A | 8/2000 | Jenkins et al. |
| 6,139,166 A | 10/2000 | Marshall et al. |
| 6,166,860 A | 12/2000 | Medvedev et al. |
| 6,166,866 A | 12/2000 | Kimura et al. |
| 6,177,761 B1 | 1/2001 | Pelka et al. |
| 6,181,476 B1 | 1/2001 | Medvedev |
| 6,201,229 B1 | 3/2001 | Tawa et al. |
| 6,222,623 B1 | 4/2001 | Wetherell |
| 6,252,636 B1 | 6/2001 | Bartlett |
| 6,268,963 B1 | 7/2001 | Akiyama |
| 6,273,596 B1 | 8/2001 | Parkyn |
| 6,282,821 B1 | 9/2001 | Freier |
| 6,301,064 B1 | 10/2001 | Araki et al. |
| 6,350,041 B1 | 2/2002 | Tarsa et al. |
| 6,356,700 B1 | 3/2002 | Strobel |
| 6,361,190 B1 | 3/2002 | McDermott |
| 6,450,661 B1 | 9/2002 | Okumura |
| 6,473,554 B1 | 10/2002 | Pelka |
| 6,483,976 B2 | 11/2002 | Shie et al. |
| 6,488,392 B1 | 12/2002 | Lu |
| 6,502,964 B1 | 1/2003 | Simon |
| 6,504,301 B1 | 1/2003 | Lowery |
| 6,547,400 B1 | 4/2003 | Yokoyama |
| 6,547,423 B2 | 4/2003 | Marshall et al. |
| 6,554,455 B2 | 4/2003 | Perlo et al. |
| 6,560,038 B1 | 5/2003 | Parkyn et al. |
| 6,578,989 B2 | 6/2003 | Osumi et al. |
| 6,580,228 B1 | 6/2003 | Chen et al. |
| 6,582,103 B1 | 6/2003 | Popovich et al. |
| 6,598,998 B2 | 7/2003 | West et al. |
| 6,603,243 B2 | 8/2003 | Parkyn et al. |
| 6,607,286 B2 | 8/2003 | West et al. |
| 6,616,287 B2 | 9/2003 | Sekita et al. |
| 6,621,222 B1 | 9/2003 | Hong |
| 6,637,924 B2 | 10/2003 | Pelka et al. |
| 6,639,733 B2 | 10/2003 | Minano et al. |
| 6,641,287 B2 | 11/2003 | Suehiro |
| 6,646,813 B2 | 11/2003 | Falicoff |
| 6,647,199 B1 | 11/2003 | Pelka et al. |
| 6,674,096 B2 | 1/2004 | Sommers |
| 6,679,621 B2 | 1/2004 | West |
| 6,688,758 B2 | 2/2004 | Thibault |
| 6,692,136 B2 | 2/2004 | Marshall et al. |
| 6,729,746 B2 | 5/2004 | Suehiro et al. |
| 6,769,772 B2 | 8/2004 | Roddy et al. |
| 6,783,269 B2 | 8/2004 | Pashley |
| 6,786,625 B2 | 9/2004 | Wesson |
| 6,796,698 B2 | 9/2004 | Sommers et al. |
| 6,803,607 B1 | 10/2004 | Chan et al. |
| 6,811,277 B2 | 11/2004 | Amano |
| 6,830,359 B2 | 12/2004 | Fleury |
| 6,848,820 B2 | 2/2005 | Natsume |
| 6,863,402 B2 | 3/2005 | Roddy et al. |
| 6,882,379 B1 | 4/2005 | Yokoyama et al. |
| 6,886,962 B2 | 5/2005 | Suehiro |
| 6,896,381 B2 | 5/2005 | Benitez |
| 6,924,943 B2 | 8/2005 | Minano et al. |
| 6,926,435 B2 | 8/2005 | Li |
| 6,948,836 B2 | 9/2005 | Ishida et al. |
| 6,953,265 B2 | 10/2005 | Suehiro et al. |
| 6,997,587 B2 | 2/2006 | Albou |
| 2002/0034012 A1 | 3/2002 | Santoro et al. |
| 2002/0080623 A1 | 6/2002 | Pashley |
| 2003/0076034 A1 | 4/2003 | Marshall |
| 2004/0070855 A1 | 4/2004 | Benitez |
| 2004/0105171 A1 | 6/2004 | Minano |
| 2004/0125614 A1 | 7/2004 | Ishida et al. |
| 2004/0189933 A1 | 9/2004 | Sun |
| 2004/0190304 A1 | 9/2004 | Sugimoto et al. |
| 2004/0228131 A1 | 11/2004 | Minano |
| 2004/0246606 A1 | 12/2004 | Benitez et al. |
| 2005/0024744 A1 | 2/2005 | Falicoff |
| 2005/0086032 A1 | 4/2005 | Benitez |
| 2005/0088758 A1 | 4/2005 | Minano et al. |
| 2005/0117125 A1 | 6/2005 | Minano et al. |
| 2005/0129358 A1 | 6/2005 | Minano et al. |
| 2005/0135095 A1 | 6/2005 | Geissler |
| 2005/0200812 A1 | 9/2005 | Sakata et al. |
| 2005/0219464 A1 | 10/2005 | Yamasaki et al. |

FOREIGN PATENT DOCUMENTS

| | | |
|---|---|---|
| ES | 2142752 | 12/2000 |
| SU | 1282051 A1 | 1/1987 |
| WO | WO 99/09349 | 2/1999 |
| WO | WO 99/13266 | 3/1999 |
| WO | WO 01/07828 A1 | 2/2001 |
| WO | WO 03/066374 A2 | 8/2003 |
| WO | WO 03/066374 A3 | 8/2003 |
| WO | WO 04/007241 A2 | 1/2004 |

OTHER PUBLICATIONS

U.S. Appl. No. 10/903,925, filed Jul. 29, 2004, Falicoff.
U.S. Appl. No. 10/901,919, filed Jul. 28, 2004, Benitez.
U.S. Appl. No. 10/851,471, filed May 21, 2004, Benitez et al.
U.S. Appl. No. 10/880,386, filed Jun. 28, 2004, Benitez et al.

Benitez, P. "Chapter 6: The SMS design method in three dimensions", from *Conceptos avanzados de óptica anidólica: diseño y fabricación*, PhD dissertation, UPM, (1998).

Benitez, P.; Mohedano, R.; Minano, J. "Design in 3D geometry with the Simultaneous Multiple Surface design method of Nonimaging Optics" Instituto de Engergla Solar, E.T.S.I. Telecommunicacion, Universidad Politecnica, 28040. Madrid, Spain. (Jul. 1999).

International Search Report PCT/US03/38240, Jul. 26, 2004.

U.S. Appl. No. 10/269,479, filed Oct. 11, 2002, Benitez.

U.S. Appl. No. 10/461,557, filed Jun. 12, 2003, Minano.

U.S. Appl. No. 10/622,874, filed Jul. 18, 2003, Minano.

U.S. Appl. No. 10/726,130, filed Dec. 1, 2003, Minano et al.

U.S. Appl. No. 10/772,088, filed Feb. 3, 2004, Minano et al.

U.S. Appl. No. 10/814,598, filed Mar. 30, 2004, Chaves et al.

U.S. Appl. No. 10/816,228, filed Mar. 31, 2004, Chaves et al.

Remillard, Everson and Weber, "Loss Mechanisms Optical Light Pipes" *Applied Optics* vol. 31 #34 pp. 7232-7241 Dec. 1992.

Parkyn et al The Black Hole™: Cuspated waveguide-injectors and illuminators for LEDs; Part of the SPIE Conference on Nonimaging Optics: Maximum Efficiency Light Transfer V, Denver, CO, Jul. 1999.

Hyper Argus®LED, Hyper-Bright, 3mm (T1) LED, Non Diffused; Mar. 1, 2000; Infineon Technologies, pp. 1-9.

Spigulis, "Compact dielectric reflective elements, Half-sphere concentrators of radially emitted light" *Applied Optics* vol. 33, No. 25, Sep. 1994.

International Search Report and Written Opinion, PCT/US2004/038162, mailed Nov. 30, 2005.

* cited by examiner

COMPACT FOLDED-OPTICS ILLUMINATION LENS

This application is a Continuation-in-part of U.S. patent application Ser. No. 10/269,479, filed Oct. 11, 2002, now U.S. Pat. No. 6,896,381, and entitled COMPACT FOLDED-OPTICS ILLUMINATION LENS.

BACKGROUND OF THE INVENTION

The present invention relates generally to optical illumination lenses, and more particularly to folded path optical illumination lenses.

Previous non-imaging folded optics utilized a light-source that had to be immersed in the dielectric medium of the lens. This immersion of the light source meant that the package containing the source, typically an LED source, is permanently glued to the lens. Additionally, the gluing requires the use of a transparent adhesive and is relatively labor-intensive.

Alternatively, previous optics were generated through injection molding, requiring the LED to be sufficiently rugged to withstand the rigors of the injection molding process. In either case the optical source is immersed deep within the body of the device.

The present invention advantageously addresses the above and other needs.

SUMMARY OF THE INVENTION

The present invention advantageously addresses the needs above as well as other needs by providing methods of designing and/or manufacturing an optical devices. In some embodiments, a method of manufacturing an optical device is provided that can comprises generating a two-dimensional representation of at least three active optical surfaces of an optical device that further comprises defining a perimeter; calculating a segment of the first surface, an entry surface and a second surface based on edge ray set according to generalized Cartesian ovals; and successively repeating the steps of calculating the segments of the first and second surface. The two-dimensional representation can further be rotationally swept about a central axis providing a three-dimensional representation of the optical device. In some embodiments, the calculating of the segment of the second surface can further comprise calculating the segment of the second surface such that the second surface is totally internally reflective.

The method in some alternative embodiments can comprises generating a two-dimensional representation of at least three active optical surfaces of an optical device, and rotationally sweeping the two-dimensional representation about a central axis, thereby providing a three-dimensional representation of the optical device. Additionally, the step of generating the two-dimensional representation can comprise the steps of calculating a segment of a first surface, based on a source's edge-ray sets, as a generalized Cartesian oval; calculating a segment of an entry surface, based on the same edge-ray set, as another generalized Cartesian oval; calculating a segment of a second, reflective surface, based on the internally reflected rays of the same edge-ray set and on their refraction by the segment of the first surface, as a third generalized Cartesian oval; and successively repeating the steps of calculating the segment of the first surface and calculating the segment of the second, reflective surface in a direction towards a source.

In some embodiments, the present invention provides a compact folded path optical illumination lens with a means for surrounding a source and associated mechanical features or secondary optics with a gas-filled gap (typically air).

In another embodiment, the invention can be characterized as a method for generating an optical beam. The method comprises the steps of refracting initial light; totally internally reflecting the light; again reflecting the light; and refracting the light, thereby producing an output light that is at least partially collimated. In some embodiments, the present invention produces the output light with central rays exiting substantially parallel to the lens axis.

In a further embodiment, the invention can be characterized as a folded-optics apparatus, comprising a transparent body including a first surface, a second surface and a cavity formed within at least the second surface; the cavity having a third surface; the second surface comprising a reflective region extending radially away from the cavity; and the first surface comprising an annular zone configured to provide internal reflection folding and an optical refractive transition between the transparent body and the exterior of the transparent body.

In an additional embodiment, the invention can be characterized as a method of manufacturing an optical device that converts a first distribution of an input radiation to a second distribution of output radiation, comprising the steps of: providing a two-dimensional model that describes the first distribution of the input radiation as an input bundle of edge rays and the second distribution of the output radiation as an output bundle of edge rays, and representing the input and output edge ray bundles each in a phase-space representation in terms of the position of each ray in the dimensions of length and angle-sine weighted by refractive index; defining a two-dimensional representation of three active optical surfaces responsive to the edge-ray boundary conditions of the phase-space representations, including successively calculating segments of at least a first and second surfaces; and symmetrically extending said two-dimensional representation of said optical surfaces to provide a three-dimensional optical device.

In an added embodiment, the invention can be characterized as an optical device that converts a first distribution of an input radiation to a second distribution of output radiation, comprising: first, second and third active surfaces, wherein the first and second surfaces are opposing active non-spherical optical surfaces, where the first, second and third active surfaces are defined by a two-dimensional representation that is symmetrically extended to provide a three-dimensional device; and the first and third active surfaces provide transitions for the first and second radiation between an exterior and interior of a body of the three-dimensional device defined by the first, second and third surfaces.

A better understanding of the features and advantages of the present invention will be obtained by reference to the following detailed description of the invention and accompanying drawings, which set forth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

Figure 1:
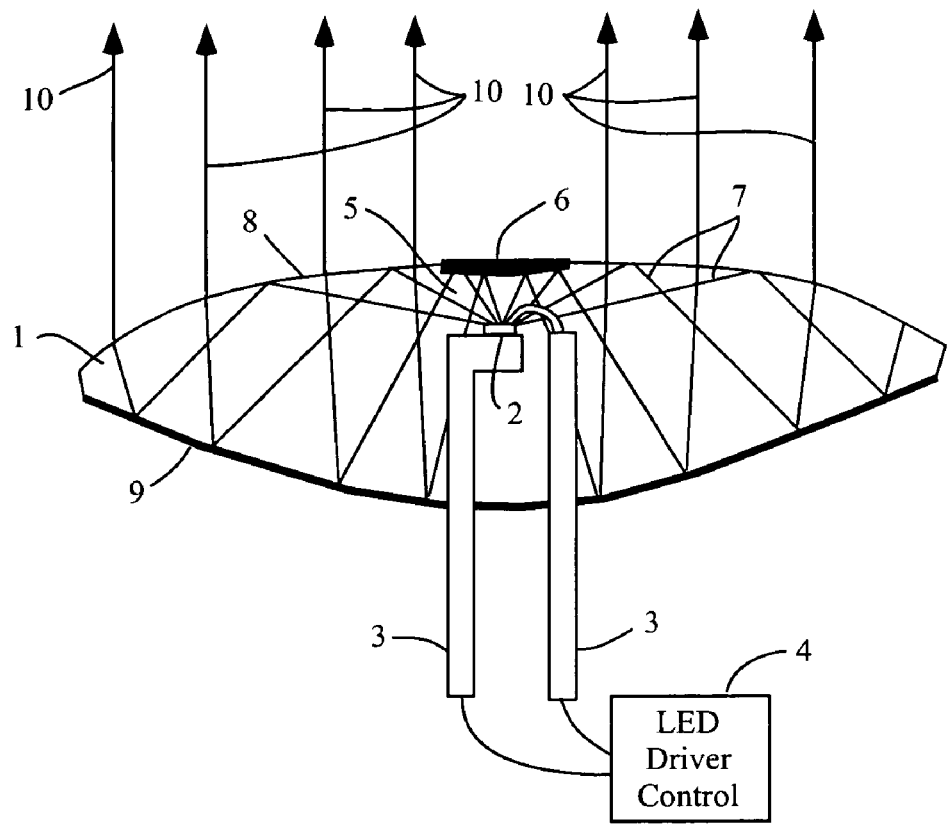
FIG. 1 depicts a previous RXI (Refractive and Reflexive and Internal Reflection) emitter lens.

The following description of the presently contemplated best mode of practicing the invention is not to be taken in a limiting sense, but is made merely for the purpose of describing the general principles of the invention. The scope of the invention should be determined with reference to the claims.

In one embodiment, an apparatus of the present invention provides a folded optical path for the efficient collimation of the optical emission of a light source, such as a light-emitting diode (LED). In one embodiment, the present invention provides for a compact optical lens providing a folded optical path. The present invention additionally provides a method for configuring and method for generating the apparatus providing the folded optical path for efficient collimation.

Previous high-efficiency non-imaging optics immerse an optical source within a lens medium. One example of a previous system that immersed an optical source is described in International Patent Application PCT pub. number WO-01/69300-A2, entitled HIGH-EFFICIENCY NON-IMAGING OPTICS, published 20 Sep. 2001, now U.S. Pat. No. 6,639,733 incorporated in its entirety herein by reference.

This immersion of the light source meant that the light source, and typically, the package containing the light source or LED source is permanently fixed or glued within the lens medium. Additionally, the gluing of the light source requires utilizing an adhesive and is a relatively labor-intensive process. Alternatively the light source (e.g., LED) has to be sufficiently rugged to withstand the rigors of injection molding. In either case the source is immersed deep within the body of the device, precluding the swapping out of defective emitters. This deep LED-placement inside the lens makes heat removal more difficult, and typically requires a pedestal to elevate the LED above a printed circuit board (PCB). Further, such optical immersion is highly inconvenient, if at all possible, for use with incandescent light sources. Thermal-stress considerations dictate that hot light bulbs cannot be glued to a lens, due to much greater thicknesses.

The present invention specifically provides numerous embodiments that allow for additional degrees of design-freedom by, in part, varying the shape of a light input surface to intercept a large portion of output light produced by a light source.

The present invention provides for a non-immersive solution to the difficulties of utilizing a previous RXI lens for illumination, where RXI is an acronym from previous devices defined from an exit beam back inwards to a source, where there is refraction (R), reflection (X), and internal reflection (I). Alternatively, the present invention provides, from an output beam traced back to the source, a refraction, reflection, internal reflection and refraction (RXIR), with the terminal refraction (R) being an additional entry-surface refraction. In one embodiment, a central cavity acts as the entry surface for a folded-optic illumination lens with superior compactness and utility.

The present invention provides illumination, and in some embodiments transmits collimated light originating from a central light source. In some embodiments, the same or similar configurations can concentrate a beam onto a target, such as an optical-communications receiver (e.g., photo-diode). In one embodiment, the present invention comprises a single piece of specifically configured transparent dielectric with first and second surfaces, both portioned into central and peripheral regions or zones. The central zone or zones are configured closest to a light source (or optical receiver). In some embodiments, the central zone or zones are positioned about the light source to at least partially enclose or surround the light source such that the radiated light is refractively admitted into the interior of the lens. The light then propagates through the reflective folded optics to refractively exit the first surface as a collimated beam. In alternative embodiments, the lens can be configured to include a through hole, bore, or tube passing through the body of the lens, aligned generally along a central axis to radially surround or enclose a light source, such as a high-temperature source (e.g., a tubular incandescent lamp).

The non-penetrated lens type described above typically includes a centrally located recess or cavity on the second side (e.g., an underside) of the lens. The recess can include a refractive entry surface that is positioned about the light source and enclosing at least a portion of, and preferably substantially all of the light from the source. In some embodiments, the non-penetrated lens is utilizes with light sources that operate at sufficiently low temperatures to allow the lens to be made of such plastics as acrylic or polycarbonate. At least a portion of the remainder of the second surface can be configured in a conicoid shape that surrounds the cavity and entry face, and can additionally include a reflective coating. Alternatively, a separate but conformal reflector could be located immediately adjacent the second surface.

A central region or part of the opposing first surface can be reflective, absorptive, or refractive, depending upon the desired effects and the particular configuration of the lens. The first surface includes a peripheral region or zone that is configured to provide internal reflection for directions toward the source as well as provide for a refractive exit face for directions from the second surface.

Both first and second surfaces typically bear reflectors that implement optical folding. The second surface reflection is typically realized by a reflective coating on the surface, while the top reflection is generally achieved through total internal reflection (TIR), with the exception of a reflective coating near the center of the upper surface. Additionally and/or alternatively, the second surface reflection can be realized through total internal reflection, similar to the first surface reflection. In utilizing an entry surface tailored to a folded optic, the present invention provides the features of compactness, efficiency, and ease of manufacturing, and additionally provides the benefits of ease of replacement of defective light sources (or receivers) together with the ability to handle higher-temperature light sources.

Light emitted from the source passes through the entry surface of the recess and into the interior of the lens. In one embodiment, the light is initially reflected off the first surface, thereby being deflected towards the reflective or mirror-coated second surface. The second surface in turn reflects the light back towards the first surface. The light then exits the lens passing through the first surface. As the light passes out the first surface it typically undergoes a refractive deflection as it exits to form a collimated output beam.

A properly shaped entry surface of the recess or cavity at least partially surrounds a light source when in operation to receive the light from substantially all around the source. As the source is not immersed within the lens, the present invention takes advantage of an enhanced deflection-capacity afforded by a source-surrounding air-dielectric interface established between the entry surface of the cavity and the exterior surface of the light source. This air-dielectric interface is not present in the prior-art RXI immersion-lenses.

Once light from the source passes through the entry surface of the cavity and enters the body of the lens, the light undergoes one or more reflections and is then refracted as it exits. The originally wide range of propagation angles of the light is reduced during its folded travel through the lens to produce a narrow in angular range, collimated output beam. Slight design modifications to a lens profile can widen the light's angular output range in order to conform to a particular illumination prescription, be it an intensity specification for an automotive headlamp, an illuminance pattern on a surface, or other illumination prescriptions. For example, a $\cos^{-3}$ intensity pattern, when applied normal to a plane, will produce uniform illuminance thereupon.

The present invention provides the increased degrees of freedom afforded by a plurality of active surfaces (e.g., three, four or more), that are deployed on the first and second lens-surfaces. Several embodiments are configured for use with LED optical emitters. Several embodiments can be manufactured by injection molding of transparent polymeric plastics such as acrylic, polycarbonate, polyarylate, and cyclo-olefins. The latter group, for example, can be used at high operating temperatures, for example at 161° C., typically 140° C., as exemplified by a cyclo-olefin based product Zeonor 1600R, produced by Zeon Corporation of Japan.

Several other embodiments can be utilized at high temperatures. The lenses can be made of glass, silicone or other similar transparent or partially transparent materials retaining their form at elevated temperatures. Such lenses can accommodate the elevated temperature levels associated with incandescent light sources, for example for use with automotive headlamps, and other high-temperature light sources. In some embodiments for use with high-temperature light sources, the lens includes a generally central cavity that penetrates through the entire lens, as a tubular hole or bore. The tubular hole can further be configured to allow convective cooling of the hot source.

The shapes of the plurality of optically active surfaces (e.g., three optically active surfaces), deployed on the first and second lens surfaces, are derived through a simultaneous multiple-surface (SMS) method. The present method, according to one embodiment, utilizes an SMS process in at least part of the method to perform a conjoint successive generation of two optically active surfaces in a system. The present method utilizes edge rays, bundles thereof, and segments of generalized Cartesian ovals so that the present apparatus transforms a source's output to fulfill an illumination task, given particular initial conditions such as lens size relative to the source.

In some embodiments, the SMS method of the present invention is a two-dimensional SMS method that begins with an analysis of particular characteristics of an LED light source, array of LEDs, or a source of other type, and how its construction and/or appearance varies with direction relative to a package axis. Previous optical collimators, such as the parabolic mirror and convex lenses, are unsuitable because of the wide angles of source-emission which LEDs exhibit as incoherent sources (i.e. inhomogeneous). Lens parameters and configuration are determined through the present SMS method disclosed herein, allowing the lens to be utilized with substantially any LED light source, whatever its optical packaging, and other light sources as well. An SMS method is partially disclosed in more generality in the above-mentioned International patent application incorporated by reference.

The present invention provides for an alternate method of deriving lens profiles. This alternative method can be utilized with collimation lenses and utilizes rays from a center of a light source in the framework of First-Order optics. In one embodiment, the process mathematically applies an SMS method, described fully below, to a small central portion of the emitting source.

The present SMS method utilizes edge rays of the light source, transforming them into either a collimated output (for example forming them into the narrowest possible output) or into an output fulfilling a specific illumination prescription. In both cases, the SMS method generates in one embodiment a radial profile that can be used to define a three dimensional lens by rotationally sweeping the profile about a central axis. An edge ray is a ray or rays of a beam or source that represent the source's angular or spatial extremes and thus form the source's phase-space boundary. Further, a phase space is an abstract two-dimensional space representing the spatial variation of the emission-directions of a source or a beam.

Besides such rotationally symmetric lenses, the present invention can be configured with some small departures from such symmetry. This allows the profile to undergo modest changes during the rotational sweep, and allows the accommodation of asymmetric illumination prescriptions, such as those for automotive headlamps.

In one embodiment, the present invention includes a central orifice for a tubular incandescent light source. In one configuration the present invention includes a lens structure with four quadrants, each having somewhat different generative profiles, but molded as a single lens. In one configuration the present invention includes a biform concentrator with rotationally variable profile that is right-left symmetric. This improved biform lens offers several beneficial attributes, two of those benefits being: superior convective flow for cooling a light source (e.g., an incandescent light source), and a reduction in bulk that allows for easier manufacturing. This is because the biform concentrator can, in some embodiments, be molded as two mirror-image free-form semi-lenses, and when placed on either side of a light source, with a small vertically oriented gap between them, the system generates a chimney-style air-flow that removes long-wavelength heat absorbed by the lamp's glass envelope.

The terms used herein of light and illumination are not restricted to the visible wavelength range of 380 to 750 nanometers, but can additionally encompass the entire ultraviolet and infrared range that is amenable to geometric optics. In these non-visible ranges, the present invention has similar technological benefits to those it provides in the visible range.

Although transparent materials suitable for the ultraviolet regime are relatively few, the incandescent-lamp configurations disclosed herein for automotive headlamps is also suitable for far-ultraviolet lithography of semiconductor manufacturing, because the present invention provides high collection efficiency and superior beam-forming capabilities. Moreover, the present invention can be equally applied to near-ultraviolet LEDs, which may soon be prominent as primary light sources for exciting visible-light phosphors.

In the near-infrared regime (e.g., 700–1100 nm), night-vision illuminators based on the present invention can be implemented to use commercially available near-infrared LEDs as light sources for lenses that can be molded of the above-mentioned plastic materials, in the same manner as for visible-light illuminators. The present invention provides excellent collimation and this makes it eminently suitable for the burgeoning field of last-mile or free-space optical communication data-links. At the greater wavelengths of mid- and long-wave infrared, the rotational symmetry that can be provided by the present invention makes it suitable for fabrication by the same diamond-turning technology used in infrared optics. One example of a particularly significant application of the present invention is a cost effective and compact aircraft-mounted infrared-jamming defense against heat-seeking missiles.

FIG. 1 depicts a previous RXI (Refractive and Reflexive and Internal Reflection) emitter lens. The lens comprises solid dielectric body 1 and immersed LED 2 located at its optical center. An electrode pair 3 conducts electrical power to LED 2 from driver/controller 4. Central ray bundle 5 emitted by the LED reflects off of a central mirror coating 6, while peripheral ray bundle 7 internally reflects off of a front surface 8. Both sets of reflective (shown as downward) going rays reflect off of a mirrored back surface 9 and exit through the front surface 8 as collimated beam 10. The LED 2, including any secondary optics manufactured with it, must be immersed into the lens 1, as such there is no air-gap or other such refractive-index interface between light source and lens.

Figure 2:
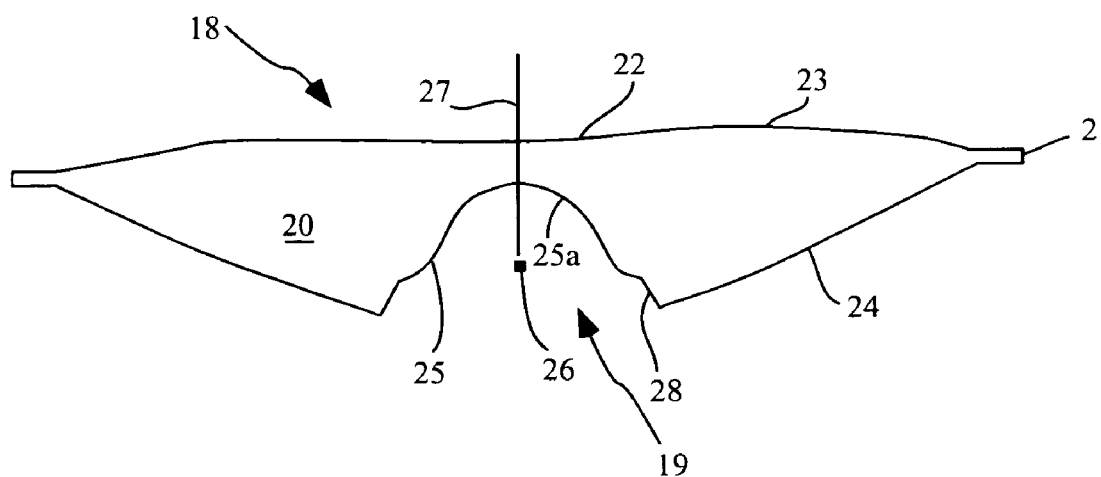
FIG. 2 depicts a simplified cross-sectional view of a lens according to one embodiment of the present invention.

FIG. 2 depicts a simplified cross-sectional view of a lens 18 according to one embodiment of the present invention. A coordinate origin indicated at point 26 is located within a light source cavity 19 at the center of curvature of an upper portion 25a of an entry-surface 25 of the cavity 19. The coordinate origin 26 is also typically a nominal location of a center of a light source 30 (see FIG. 4). The coordinate origin is additionally a focal point or area for received light when the apparatus operates as a optical receiver.

Figure 2A:
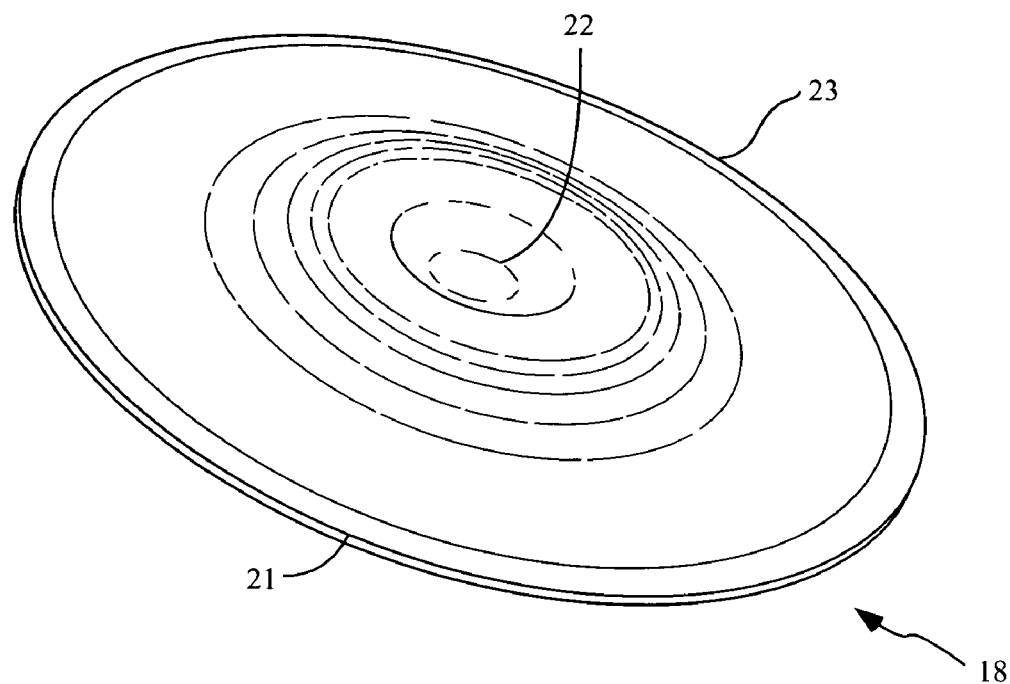
FIGS. 2a–2c depict perspective views of alternative embodiments of the lens of FIG. 2.

Central axis 27 is the center of rotational symmetry. Lens body 20 can be configured to include mounting flange 21 on the lens periphery. The lens' first or upper surface comprises a central flat surface or region 22 and surrounding curved surface or region 23. FIG. 2a depicts an elevated perspective view of the upper surface of the lens 18.

Figure 2B:
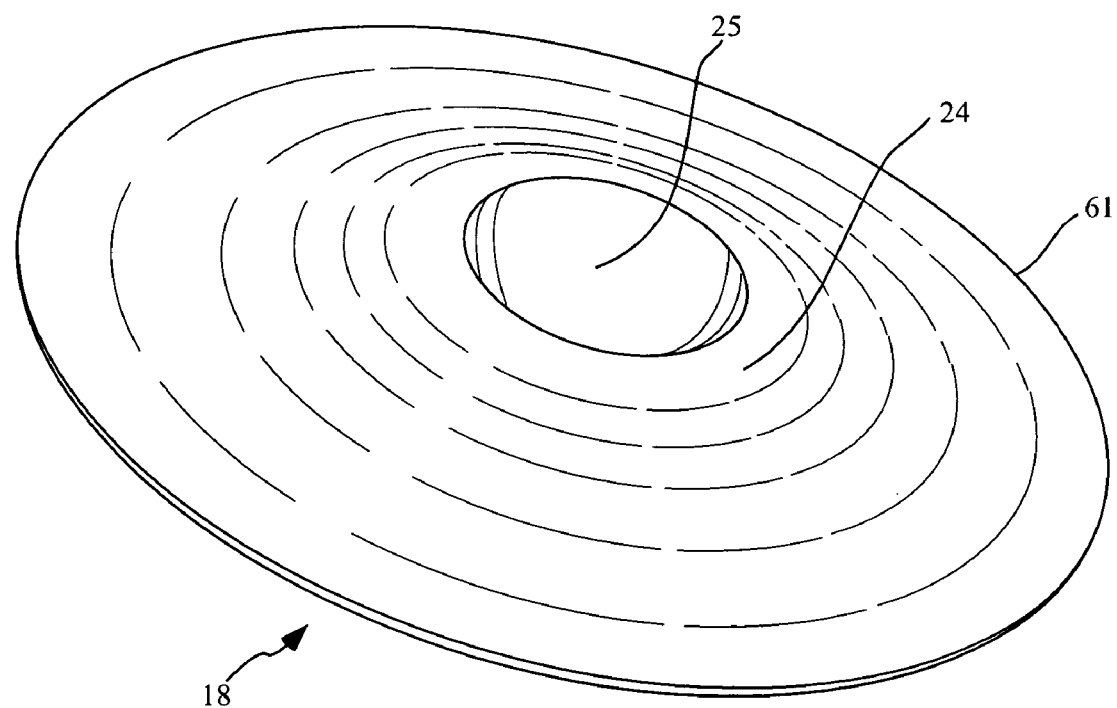

Referring back to FIG. 2, a lower surface of the lens comprises an outer reflective surface or mirror 24 and includes the cavity 19. The cavity can have substantially any shape or form to receive the light source. In one embodiment, the cavity 19 is bell-shaped with entry surface 25 forming the surface of the cavity to receive, and in some embodiments substantially enclose a light source. Inactive surface 28 (intercepting substantially no light) encompasses the extra thickness the lens is given to accommodate the thickness of the mounting flange 21, without which the lens would be even more compact, and utilizing a different type or mode of mounting. FIG. 2b depicts a perspective view of the lower surface of a lens 18 with the reflective surface 24, and the cavity 19 with entry surface 25. The embodiment of the lens 18 shown in FIG. 2b is flangeless and alternatively has peripheral sharp edge 61 allowing for alternative modes of mounting.

Figure 2C:
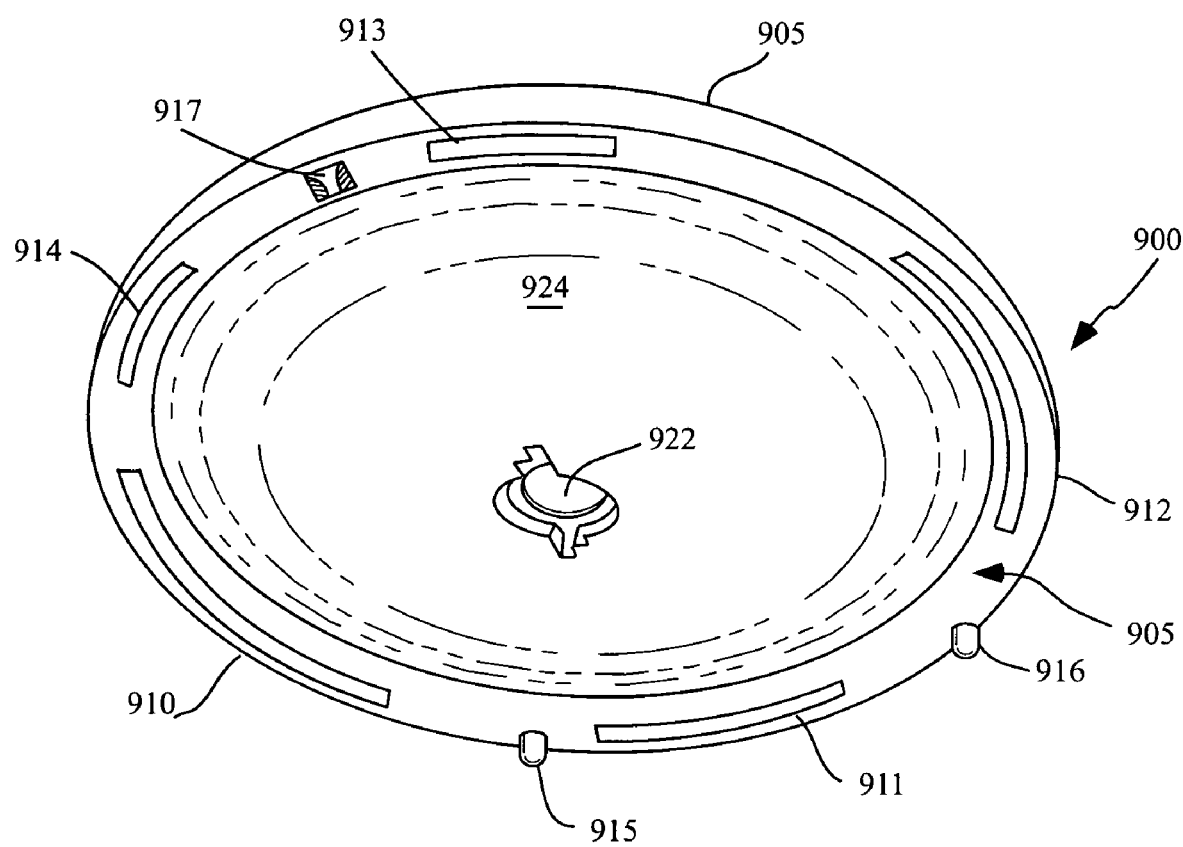

The present invention can employ several different modes of mounting. In one embodiment, a snap-fit mounting is utilized to secure and accurately mount the lens. FIG. 2c shows a perspective view of a lens 900 showing the lower surface, which could be formed with injection-molded transparent-polymer. The lens 900 includes an intricate central cavity 922 shaped to receive and closely conform to the shape of a previously contemplated LED package (e.g., the Luxeon, as discussed below).

The lens 900 is mounted utilizing securing and/or positioning devices or means incorporated into mounting flange 905. A snap-fit means can include one or more grooves 910–914 (such as azimuthal grooves), as well as pegs or tabs 915, 916 and 917. The snap-fit components work in conjunction with corresponding snap-fit components on interlocking parts of the lighting product that incorporates the lens 900. The snap-fit provides for assembly that meets required tolerances while rear mirror surface 924 is not touched.

Figure 3:
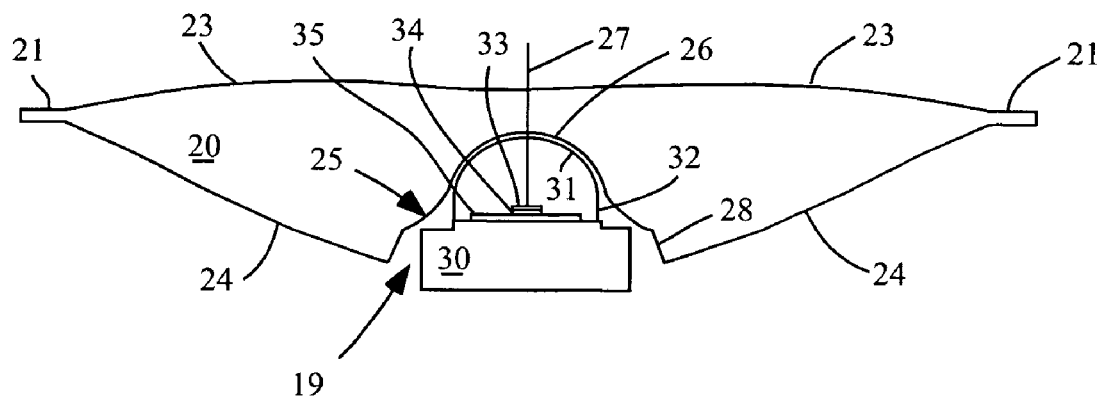
FIG. 3 depicts a lens, similar to that shown in FIG. 2, positioned over an optical source.

FIG. 3 depicts a lens 20, similar to that shown in FIG. 2, positioned over an optical source, such as a dome-packaged LED 30, an array of LEDs or other sources. The LED can be substantially any LED. In some embodiments, the LED radiates into substantially a hemisphere, preferably somewhat more. The LED depicted is similar to a commercially available Luxeon white LED manufactured by the Lumileds Corporation, with a ±100° emission pattern. However, the lens can be configured through the SMS method described herein to be utilized with substantially any LED, wide-angle LED, mounted LED and other light sources and wide-angle light sources. Similarly, substantially any other commercially available light-source package could also be used by the design process set forth herein. The Luxeon provides a high white-light luminosity, and does not introduce nonuniformity-marring shadowing by top electrodes, due to the Luxeon being what is referred to as a flip-chip.

The transparent dome of the optical source 30 is comprised of a hemisphere region 31 extending to a short cylindrical section 32 below the hemisphere region. An emitting chip 33 is immersed within the dome medium, having for example a refractive index of 1.54, and mounted on a substrate 34. The chip 33 and substrate 34 are surrounded by a planar reflective surface or mirror 35. Typically, the source 30, including the dome 31 and chip 33, shares with the lens a rotational-symmetry central axis 27, shown extended into the lens 20 to coincide with the axis 27 (see also FIG. 2). The emitting chip 33 is typically square, and as such the axis 27 coincides with a quadri-symmetric axis of the chip 33.

The optical source 30 is positioned at least partially within the cavity 19. The lens is positioned about the source 30 such that the entry surface 25 of the cavity 19 is positioned and maintained in close proximity to the LED source. In some embodiments, the entry surface of the cavity is maintained within at least ±1.0 mm, preferably within at least ±0.1 mm, and more preferably within at least ±0.05 mm of an intended position relative to the LED.

Figure 4:
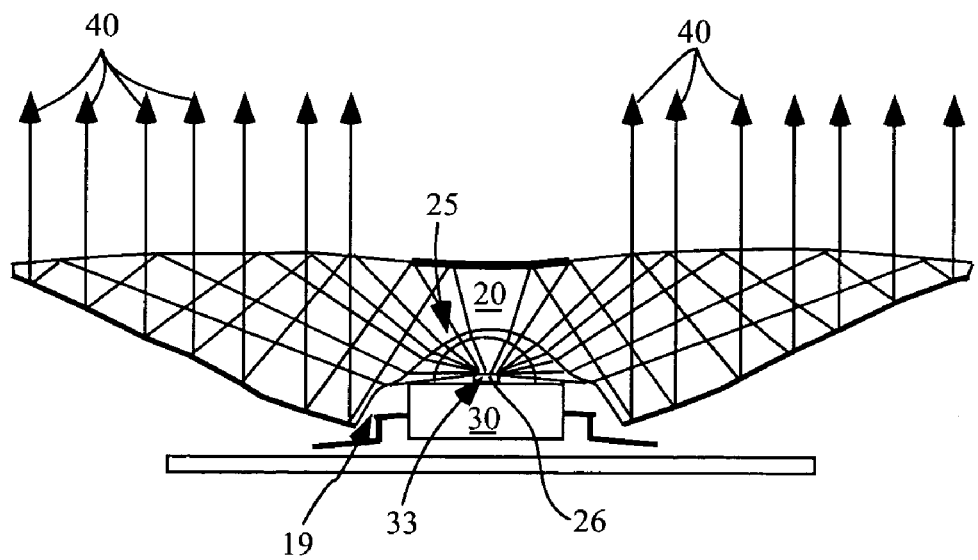
FIG. 4 depicts collimation provided by a lens, where the lens can be similar to those shown in FIGS. 2 and 3.

FIG. 4 depicts collimation provided by a lens 20, where the lens can be similar to those shown in FIGS. 2 and 3. The lens 20 is positioned proximate to and over an LED light source package 30. The lens 20 emits collimated central rays 40 that originally radiate out from a coordinate origin 26 and propagate along folded light-paths within the lens.

The present invention additionally provides a method of deriving embodiments of lenses to achieve a desired output 40, such as a desired collimated beam 40. In one embodiment, the method for deriving the characteristics and structure of the lens begins with an examination of the optical structure of the light source's radiant emission, and utilizes a simultaneous multiple-surface (SMS) method. The present invention additionally determines a novel and additional third entry surface 25 that improves upon previous lens configurations.

The rotational symmetry of this invention is around a central axis 27 (see FIG. 3), about which the collimated output 40 is formed and centrally organized. This central axis generally passes through the center of the light source 33. The dome-packaged LED 30 of FIGS. 3 and 4 is typically aligned along the central axis 27, which is aligned with the symmetry-axis of the lens embodiment (configured with a source cavity 19 typically designed for the source 30). Accordingly, the lens profiles generated through the present method typically lie in a cross-sectional plane that is depicted in the figures and discussed below. The lens profiles can be rotationally swept through 360° to generate the surfaces of a lens of the present invention.

Figure 5:
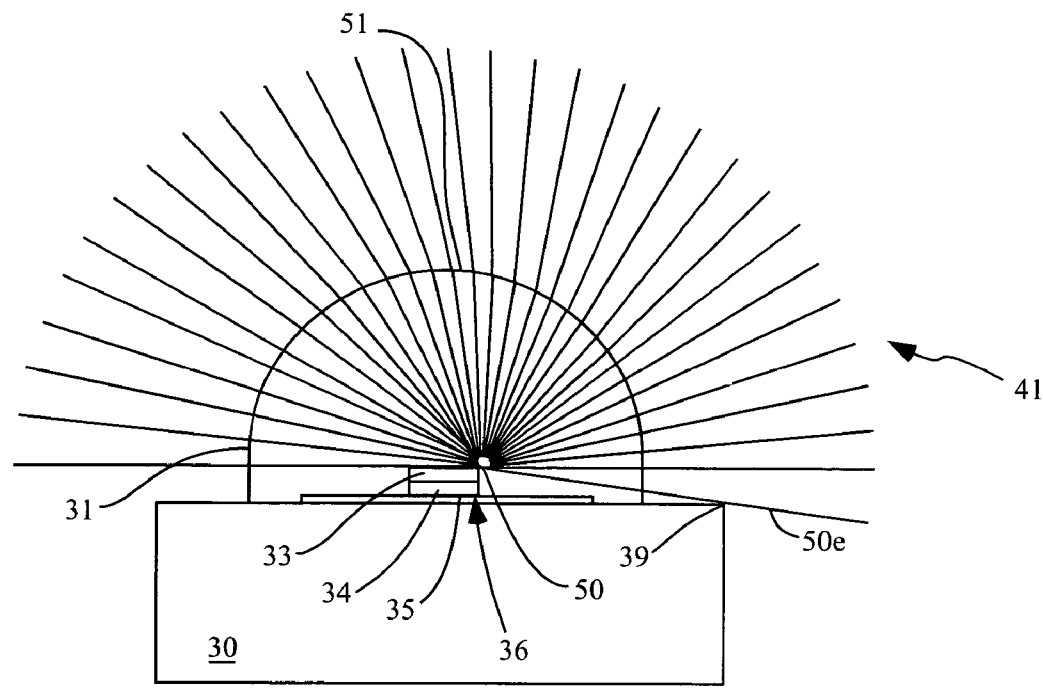
FIGS. 5 and 5a–5c depict enlarged cross-sectional views of a source with ray fans radiating from the source.
Figure 5A:
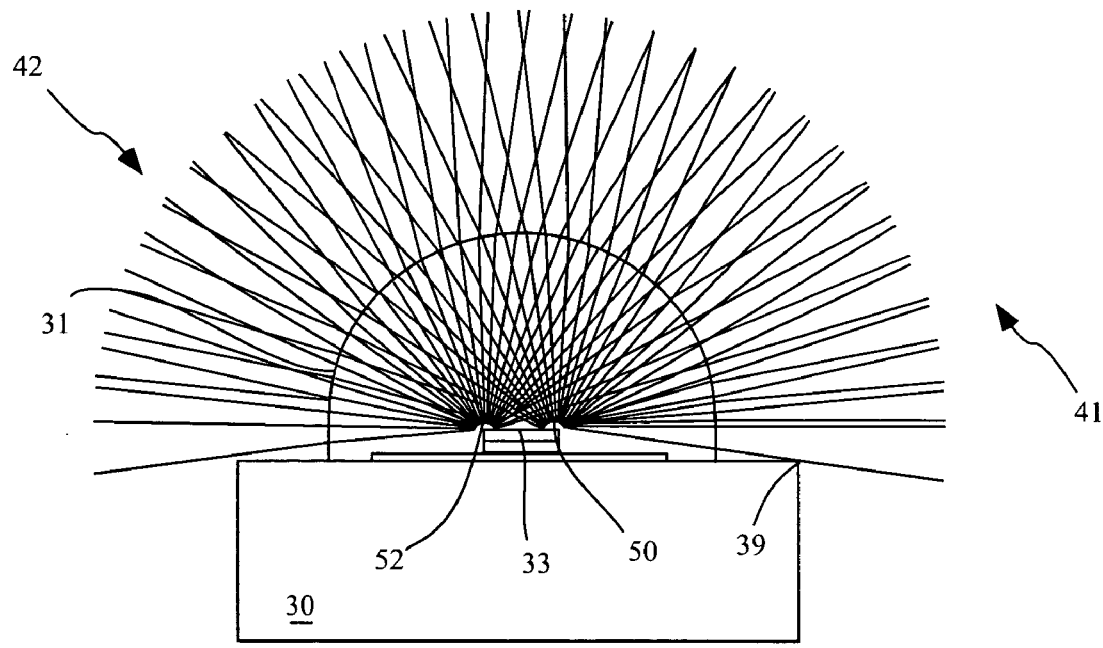

In one of the initial steps in the determination of a lens configuration according to one preferred embodiment, a detailed spatio-angular radiance distribution, specified in close proximity to the proposed light source, is schematically depicted and characterized. This allows for a determination of a maximum possible degree of collimation for the design, taking into account this distribution information together with a number of other parameters, such as the size of the source and the diameter of the collimating optic. Accordingly, FIGS. 5 and 5a depict a simplified cross-section view block-diagrams of a dome-packaged LED 30 and light-emitting chip 33 mounted on a silicon base 34 which in turn is mounted on a planar reflective surface or mirror 35. Referring to FIG. 5 depicting an enlarged cross-sectional view of a source, where a ray fan 50 radiates from a first corner or edge, for example the rightmost corner 36 of the chip 33. The ray fan 50 represents a generally spheric wavefront propagating outward therefrom.

Because the wavefront is situated off the center of dome 31, this wavefront becomes non-spherical (i.e., aberrated) after being refracted into the air surrounding the surface of the dome 31. The rays shown in FIG. 5 extend outward well beyond the package boundary of the dome 31 to depict the directional distribution at the surface. In some embodiments, an air gap typically established between the dome surface 31 and the entry surface 25 of a lens (for example, the air gap can have a width of 0.1 mm). It is additionally noted in the present invention that the package's upper-corner 39, outside the dome 31, defines an extreme ray 50e of the ray fan 50. The refraction of the wavefront is shown at point 51 where several rays are deflected as a consequence of their being refracted at hemispherical surface 31. These rays belong to the refracted wavefront that represents one set of edge rays used in the process of designing a preferred lens 20.

As well as ray-fan 50, FIG. 5a depicts mirror-image ray-fan 52, radiating from a second or leftmost corner of chip 33, propagating outward through dome 31. The edge-ray fan 52 radiating therefrom is additionally utilized in the method for configuring a lens.

Figure 5B:
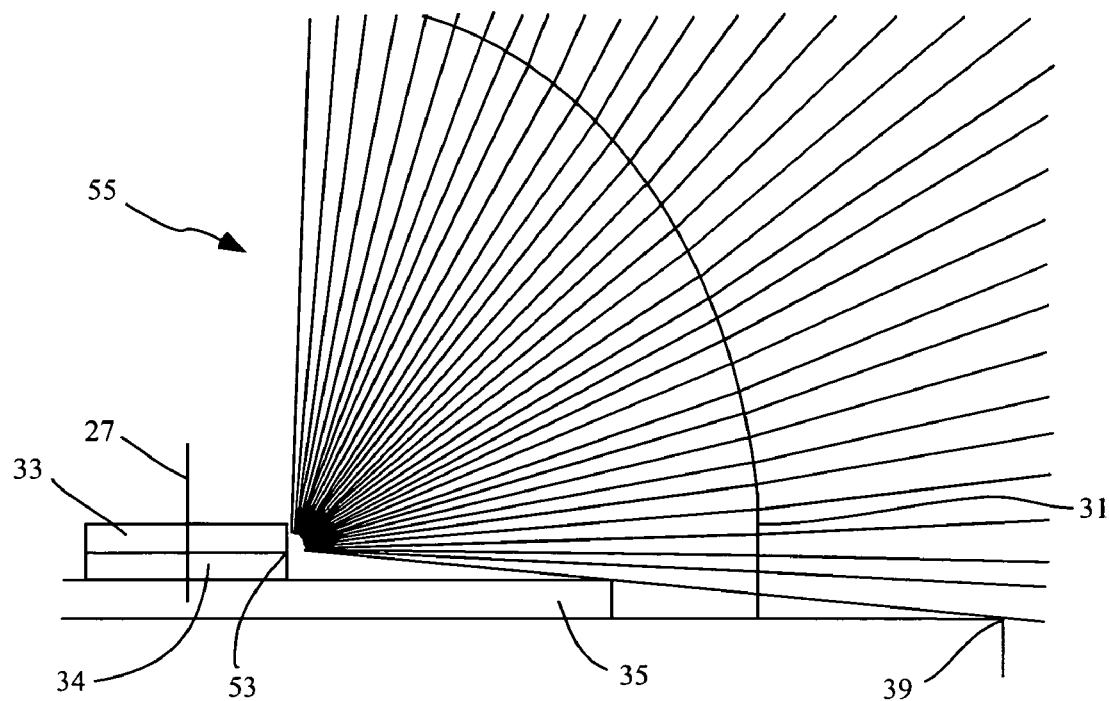

The light emission from a thin side of the chip 33 (e.g., having a height of 0.15 mm, depending on the light source and manufacturer) is taken into consideration. The luminosity resulting from this side portion of the chip is utilized in the method for designing a lens because high emission-luminance is obtained over its surface. (The area of the four emitting sides of the chip amounts to approximately 60% of that of the top, with typically a phosphor coating on the side chip giving about the same luminance as on the top.) FIG. 5b shows an enlarged view of the emitting chip 33 mounted on an opaque silicon base 34, under which is mirror 35. Corner 53 of the chip 33 defines another set of edge rays 55 that are typically used in initial stages of one embodiment of the method for designing a lens. The edge ray fan 55 represents approximately 100° of rays emitted by the bottom-corner 53 of the chip out to an extreme ray that just misses package-corner 39.

Figure 5C:
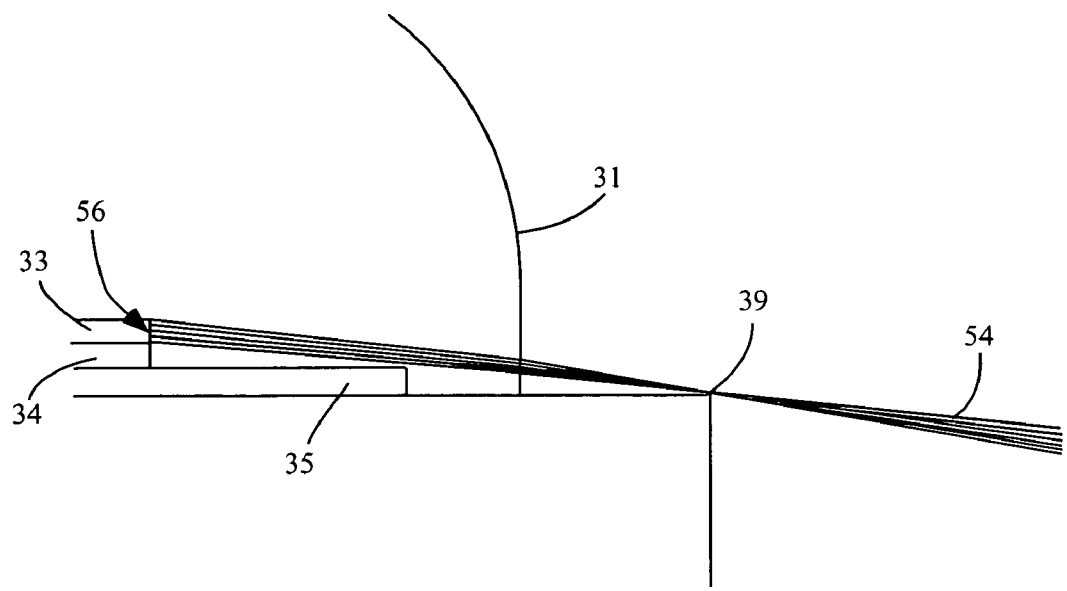

Proceeding up the side from bottom-corner 53 of emitting chip 33, FIG. 5c shows an enlarged view of the emitting chip 33 with the edge-rays of fan 54 utilized in lens design. The edge-rays 54 are emitted by the chip-side 56 and propagate to just miss the obstructing-corner 39 of the LED package, outside dome surface 31.

Figure 5D:
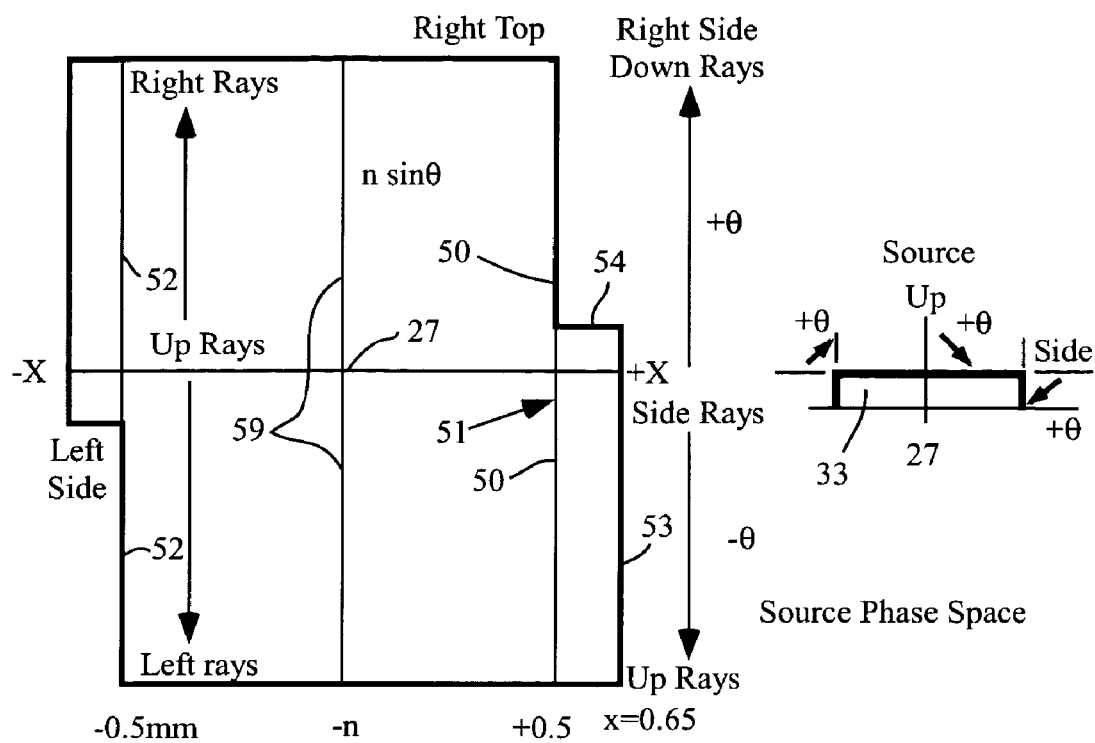
FIGS. 5d–5e depict examples of simplified phase-space diagrams with edge-rays representing boundaries of corresponding phase-space of the source.

FIG. 5d depicts an example of a simplified phase-space diagram where these edge-rays 50, 52, 54 and 55 are used to represent the boundary of the corresponding phase-space of the source. More specifically, these edge-rays can represent the phase-space boundary of the in-plane emission of the top of the chip 33. In this example the light source packaging has a dielectric of index n. On the right of the phase-space diagram, source chip 33 is shown with the three surface normals, on the top and both sides, used to define an angle α. On the left is the "source phase-space" diagram, extending vertically according to ±n sin α, where n=1.54 and α is within the ±90° range, with negative values for rays at counter-clockwise angles from the surface normal. The rays from the top of the emitting chip 33 are in that part of the phase space between approximately −0.5 mm on the left and +0.5 mm on the right. To either side are two smaller zones of side-emission.

Symmetry axis 27 also defines a synonymous point at the center of the source phase space. Ray fans in previously-discussed Figures are represented here by various lines. Right ray-fans 50 and left ray-fans 52 of FIG. 5*a* can be represented by right and left bounding lines 50 and 52 in the source phase space. Similarly for corner ray fan 53 of FIG. 5*b* being outermost line 53, and line 54 corresponding to limiting rays 54 of FIG. 5*c*. The centerline 59 is the central-ray bundle, originating at the chip center, designated here by point 27.

The idea of phase space is a two-dimensional mathematical construct with one axis being the spatial coordinate of distance x from the axis of rotational symmetry and the other being the sine of a ray's inclination α from this axis, multiplied by the refractive index n of the medium in which the ray is propagating. Such coordinates are well known, and introduced in Hamiltonian optics. These edge rays are used in the method of the present invention, because as long as they are collimated, the rays within the phase-space boundary they define are also collimated. Thus, the design methods disclosed below utilize these edge rays in order to establish a lens profile.

The total area of phase-space representation of the chip emission, usually called etendue E, can be numerically calculated in the phase space. The etendue can further be defined as a phase-space area that is a characteristic of a source, or of a beam, that cannot be increased by an optical device. The Second Law of Thermodynamics, when applied to incoherent light sources, is equivalent to the Etendue Conservation Theorem, which states that the etendue of the chip emission cannot increase during passage through an optical system. If the exit aperture diameter D of the system is fixed, the conservation of etendue fixes a lower limit upon the output angular collimation (if no light power is to be lost). This goal is attained when the output beam is limited to a narrow emission angle α. The etendue of this output beam is given by:

$$E = 2D \sin \alpha,$$

and thus an etendue-limited device will have:

$$\alpha = \sin^{-1}(E/(2D)).$$

Figure 5E:
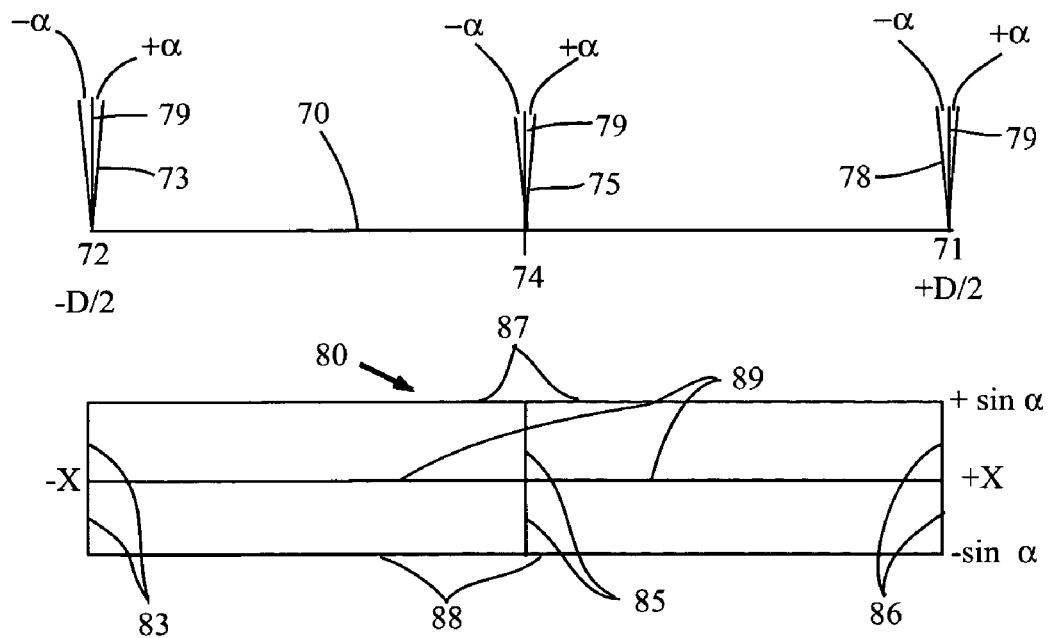

Referring to FIG. 5*e*, the optically active diameter of surface 23 of the lens shown in FIG. 3 can correspond to the 35 millimeters of the aforementioned manufactured lens. Referring to FIG. 5*d*, the source chip 33 (for example the Luxeon) can have a width (e.g., of 1 mm) radiating into ±90°, a height (e.g., of 0.15 mm), so the sides radiate into a 100° angle, all within the dome medium having a refractive index of, for example, approximately 1.54. The phase-space outline leads to an etendue of:

$$E = ([2+2*0.15*(1-\cos 100°)]*1.54) = 3.62 \text{ mm},$$

which means that the output beam of lens 20 can be no narrower than:

$$\alpha = \sin^{-1}(3.62/(2 \times 35)) = 2.96°.$$

This leads to FIG. 5*e* depicting an output aperture (above) and output phase space (below) in the air just above the lens, where it is assumed that n=1. For example, the aperture width D can be 35 mm and the phase space is ±sin(α) (n=1) across, having the same etendue (phase-space area) as the source phase space of FIG. 5*d*. It is noted that line 89 represents the parallel rays exiting across the entire lens width, all of which originated at the center of the emitter and lie on line 59 of FIG. 5*d*. Thus a point on the source becomes a line at the lens exit, while all the various angles of the rays leaving that point become parallel rays across the lens exit. This may be thought of as a phase-space rotation of 90°.

This small value of α=±2.96° collimation is substantially narrower than that of a parabolic mirror having the same diameter, due to the widely varying distance from the parabola's focal point to the points defining a profile, a defect well-known in imaging optics as coma. In the present invention, however, the degrees of freedom afforded by the shapes of a plurality of folding surfaces, e.g., upper surface 23 and lower surface 24, provides optical path lengths that are nearly the same from the source to the various points on the exit surface 23, resulting in a substantially uniform angular output ±α across the lens.

Fulfilling a prescribed illumination pattern, normalized to overall beam luminosity, can be accomplished by suitably varying the edge-ray output angle α during the SMS method disclosed herein. However, shape factors may limit how much the edge ray output can vary. Alternatively or additionally, the output intensity-pattern can be tailored by having the central rays, as exemplified by those in FIG. 4, come out diverging or converging.

Figure 6:
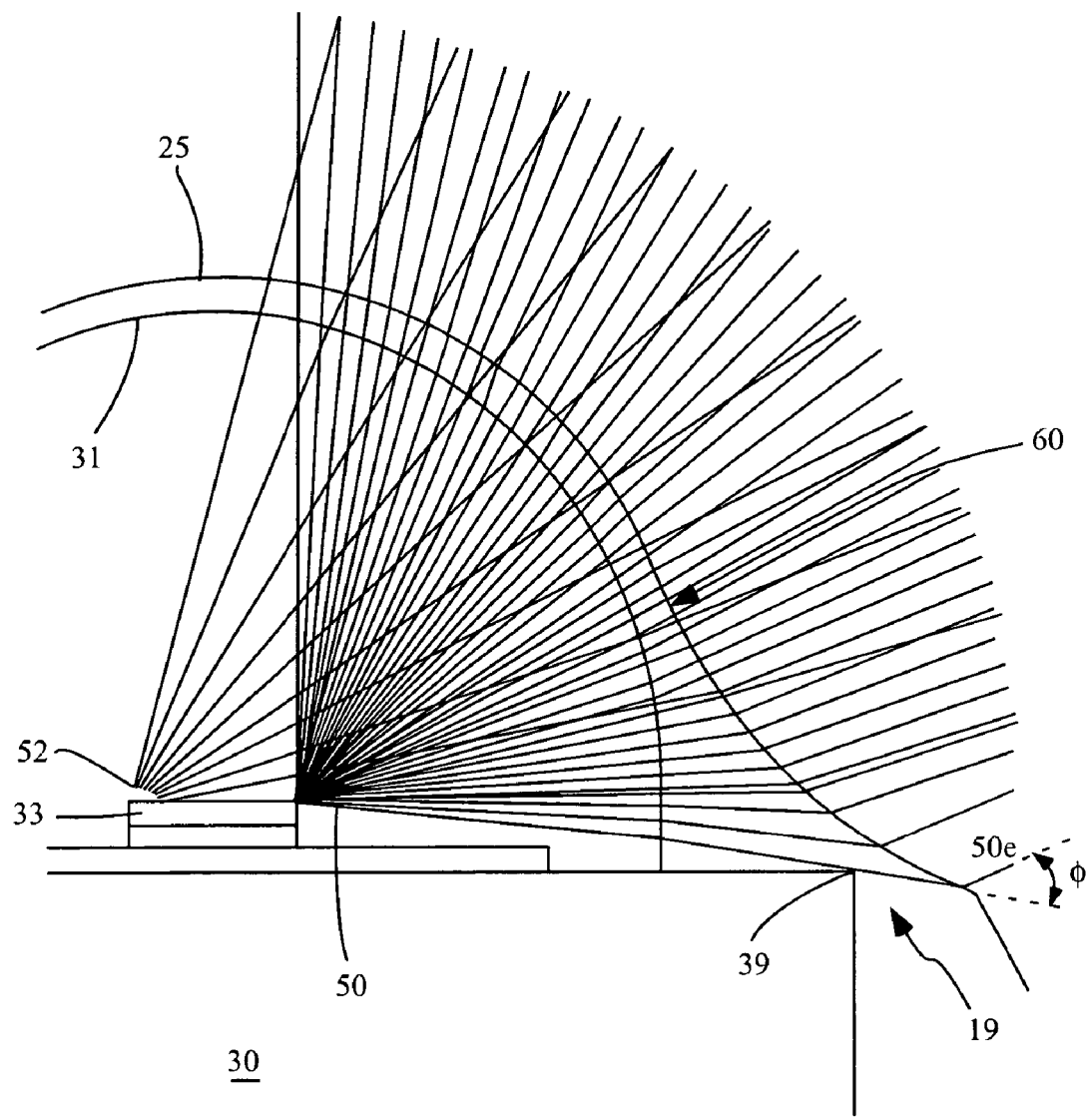
FIG. 6 depicts an enlarged cross-sectional view of a portion of an optical source and a portion of an entry surface positioned proximate the source.

FIG. 6 depicts an enlarged cross-sectional view of a portion of an optical source 30 with LED 33 encased in a dome and a portion of an entry surface 25 of a cavity 19 positioned proximate the source 30 and dome surface 31. The design of entry surface 25 of cavity 19 is specifically configured to affect the propagation of at least a portion of the edge-rays, including the right ray-fan 50 and left ray-fan 52.

Extreme ray 53, which just passes the corner 39 of the package of source 30, passes through the entry surface 25 and is deflected from its original angle (for example, 100°) by a predefined angular change φ, for example an angular change of 30°. This 30° angular change is equal to about a practical maximum amount for a single refraction at a refractive index around n=1.54. The edge rays have thereby been angularly compressed to ±70°, which confers several improvements over previous RXI devices, as the device depicted in FIG. 1. Four of those improvements include:

(1) The source 30 can be located well below a plane of the exit face or surface, enabling simple and straight forward PCB mounting. As shown in FIG. 1, previous devices required the source chip 2 to be well above the peripheral edge of lower surface 9;

(2) The overall lens thickness can be reduced, for a more compact configuration. The lens thickness can be further reduced by eliminating flange 21 and inactive surface 28 (see FIG. 2);

(3) The lens thickness at generally the center can be increased over the quite small distance of the previous device defined from source 2 to lens-top 8 shown in FIG. 1; and (4) The source 33 is not immersed in the lens 18 (see FIG. 2), allowing easy replacement or swap-out of a defective source, alternate source or improved source, as well as eliminating the laborious and bubble-prone step in previous devices of adhering the source to the lens of FIG. 1.

The proposed advantage of immersion is the elimination of Fresnel-reflectance losses, about 4%, at each air-plastic interface (surfaces 31 and 25). In some embodiments, the present invention alleviates this double loss by utilizing an anti-reflection coating on the entry surface 25 of the cavity 19. In some embodiments, an anti-reflection coating is also added to the hemisphere surface 31 of package 30.

Referring back to FIG. 6, an inflection point 60 is additionally shown indicating a point along the entry surface 25 where the surface flares out from a generally central spheric shape. The central spheric shape generally has the purpose of being concentric with the dome of the LED package. It is noted that the rays passing through the entry surface 25 below the inflection point 60 are approximately parallel to the 70° angle of extreme ray 50e, which just clears the corner 39 or package 30. Every point of the upper and lower surfaces of the lens receives one edge ray each from right ray-fan 50 and left ray-fan 52 (shown for clarity with fewer rays). Violation of this condition during subsequent design stages means that the design input parameters would have to be modified. In one embodiment, the present method depends upon each derived point encountering only a single pair of edge-rays, constraining the possible shapes for the entry surface of the present invention.

FIGS. 7–12 depict a series of partial cross-sectional views of a lens according to one embodiment of the present invention, positioned proximate a source for determining and/or configuring lens parameters FIGS. 7–12 depict a series of cross-sectional views of a lens 20 according to one embodiment of the present invention positioned proximate a source 30 demonstrating at least part the design stages of the present method for determining and/or configuring lens parameters. For the sake of clarity in this series of figures, LED package 30 has been shown reduced in relative size. Only portions under consideration are shown of the upper and lower lens surfaces 23 and 24. These Figures depict the derivation of the lens profile, as such they only show a right side of the lens profile, the left side being understood to be its mirror image about the lens's central axis (i.e., axis 27 of FIG. 2).

The design procedure is based on the Edge Ray Theorem of Nonimaging Optics, which is generally defined as when all edge rays entering an optical system end up leaving it, so will all rays within the phase-space boundary they form. Utilizing the Edge Ray Theorem, the present invention establishes that by transforming the chip's emission into an etendue limited output beam, it is necessary and sufficient to calculate the profiles of the optical device that transform the edge rays of the chip into the edge rays of a ±α output beam. A desired beam diameter has right edge at point Q, which can be real but in this case is virtual (as in FIG. 7).

Referring back to FIG. 5e output aperture 70 is depicted, extending from rightmost point 71 to leftmost point 72, and output phase-space rectangle 80 is also depicted. Points 71 and 72 respectively correspond to points Q of FIG. 7 and its mirror image Q' (not shown in FIG. 7).

Still referring to FIG. 5e, collimated bundle 73 is emitted from leftmost point 72 of exit aperture 70, and represents left boundary 83 of phase space rectangle 80. Central bundle 75 through aperture center-point 74 represents centerline 85, and rightmost bundle 76 represents right boundary 86 of rectangle 80. Upper boundary 87 represents the rightmost collimated edge rays coming from across aperture 70, referred to hereinafter as +α rays, while lower phase-space boundary 88 represents the leftmost collimated edge rays coming from across aperture 70, hereinafter referred to as −α rays. Centerline 89 represents rays across the aperture that are aligned with the surface normals 79 of aperture 70.

Figure 7:
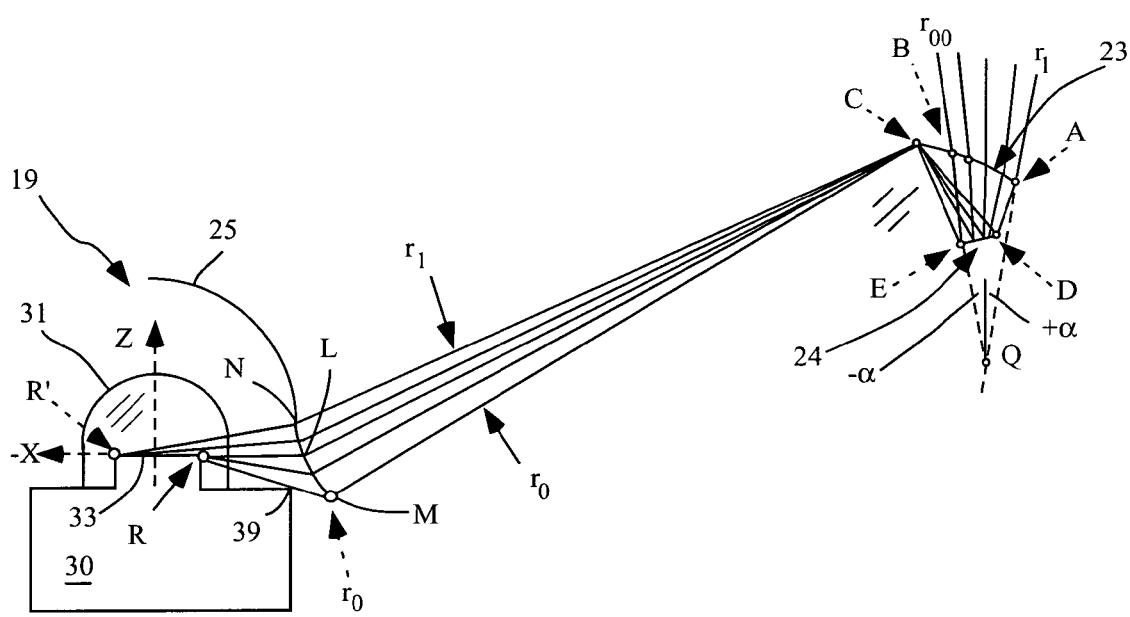
FIGS. 7–12 depict a series of partial cross-sectional views of a lens according to one embodiment of the present invention positioned proximate a source for determining and/or configuring lens parameters.

FIG. 7 shows a first stage of lens design. Emitting chip 33 extends from a leftmost point R' to rightmost point R. In one embodiment, the method of the present invention proceeds to calculate each element in FIG. 7 in a predefined order. For example, the method initially sets the position of the point Q. The horizontal location is merely the outer radius of the optically active aperture of the device, and is typically determined for a given application. Moreover, the horizontal position of Q determines the emission angle α by the etendue limitation formula for aperture width D and effective emission-chip width d (e.g., 1.3 mm) and package refractive index n, calculated by:

$$D \sin \alpha = nd.$$

On the other hand, the vertical location of Q is a free parameter. From virtual source Q radiate exiting edge-rays $r_{00}$ through $r_1$, correspond to phase-space bounding line 86 of FIG. 5e.

In a next step of the method, as shown in FIG. 7, an outermost aperture point A of the top surface 23 is selected. The point A is selected to be somewhere along ray $r_1$ propagating upward from source Q, which is actually the virtual image of point C. Then a location for point C of the top surface 23 is selected, specifying an exit-surface profile-segment AC by a low-order polynomial, preferable one with no inflection points. Point B is the intersection of curve AC along the upper surface 23 with the ray $r_{00}$ whose unrefracted reverse trace passes though Q. Next, the refraction of ray $r_{00}$ at B by the surface represented by curve AC is calculated.

Bottommost ray $r_0$, which just clears outermost corner 39 of package 30, is refracted upwards to point C. This is done at an outermost point M of segment MN of the entry surface, which also joins smoothly at point N with the central, hemispherical part of the entry surface. Segment MN refracts rays from points R and R' of the source 33 into rays converging on point C. Segment MN is thereby a particular case of the generalized Cartesian oval problem: find the refractive or reflective surface that transforms the rays of one given wavefront into the rays of another given wavefront. The original Cartesian oval problem, stated and proven by Descartes in the seventeenth century, sought the surface (called the Cartesian oval) that refracts or reflects a spherical wavefront originating from one point into another converging spherical wavefront to a different point. The Cartesian oval is generally a fourth-order polynomial (but including the ellipse, hyperbola and sphere as special cases) which is uniquely determined once a single point upon it is fixed (assuming that the spherical wavefronts and the surface type, refractive or reflective, are of course given). The solution to the generalized Cartesian oval problem is also well known (since Levi-Civita in 1900) as given by equating the eikonal functions associated to the two given wavefronts. (An eikonal can be defined as a mathematical representation of electromagnetic waves when radiant flux is ignored and only locations and directions of rays are used.) The generalized Cartesian oval is used hereinafter in a similar manner to specify successive segments of the profiles of the upper and lower surfaces of the lens.

After specifying generalized Cartesian oval segments MN of the entry surface and AC of the upper surface, segment ED of the reflective bottom surface is calculated as the generalized Cartesian oval that transforms the rays totally internally reflected from C into rays propagating upward to segment AB, which transforms the rays into the exiting ray-fan propagating from virtual source Q, including transforming ray $r_0$ into ray $r_{00}$.

The edge rays originating at points R and R', on emitting chip 33, are ultimately transformed into the exit bundle ±α, which has a virtual origin at Q. If Q and A have been selected close to each other, this tends to also bring points A through E closer together, shifting upwards the bottom surface 24, until inactive-surface 28 and flange 21 (see FIG. 2) are eliminated. Such a configuration, shown in FIG. 2b, is another preferred embodiment of the present invention. In this embodiment, the reflective surface 24 is configured to surrounds the cavity 19 and extend radially outward to a sharp edge 61.

The portion of the entry surface 25 above the inflection point N (away from point M) can be selected as the upper part of a simple hemisphere. As discussed below, other shapes cause different preferred embodiments to be generated.

Figure 8:
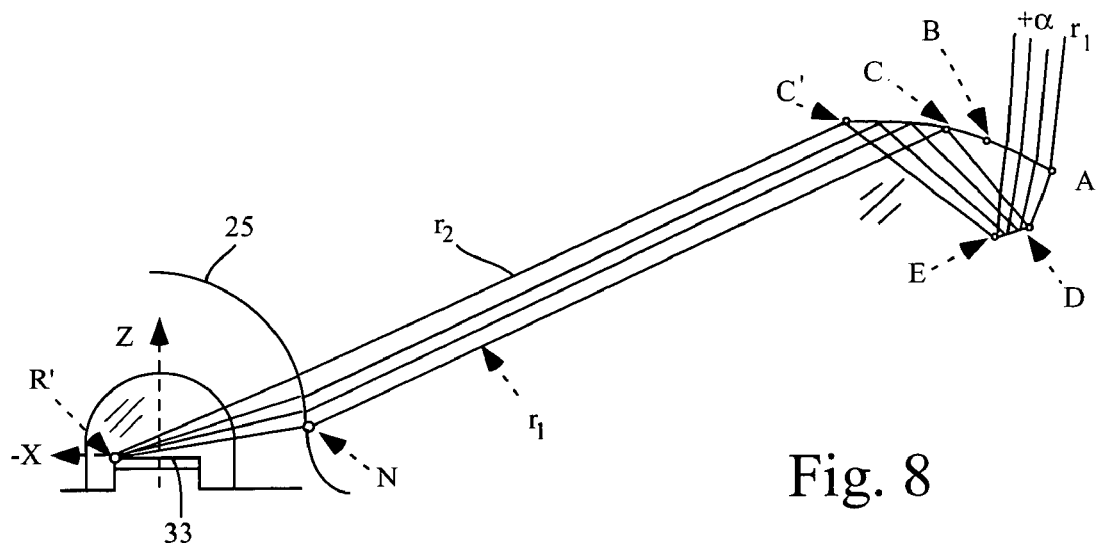

FIG. 8 depicts the next stage in the method for designing the lens. Edge rays $r_1$ to $r_2$, originating from leftmost point R' of emitting chip 33, are refracted by the hemispheric portion of entry surface 25 (above point N), and proceed approximately in parallel to profile segment CC'. Segment CC' is a generalized Cartesian oval that internally reflects this set of edge rays ($r_1$ to $r_2$) so that they propagate to the profile segment ED. The segment ED reflects the rays upwards to be refracted by profile segment AB into the substantially parallel ray set designated +α. It is noted that the rays originating from the spatial edge of the source end up at the angular edges of the collimated output.

Figure 9:
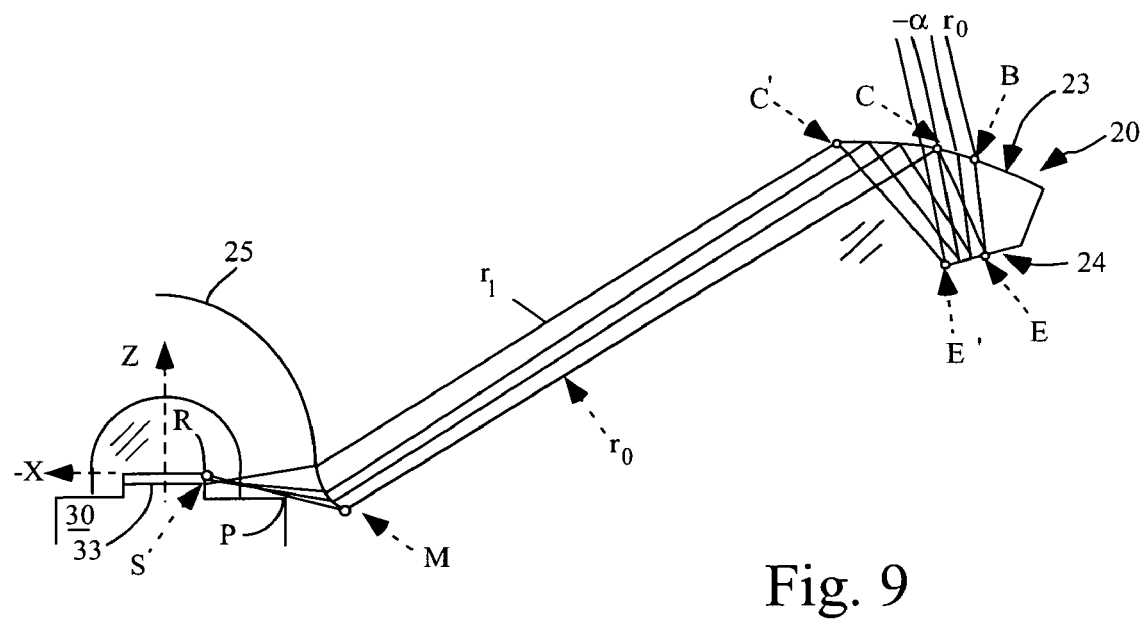

FIG. 9 depicts a further step of the method for determining a lower surface profile segment EE'. A bottom corner point S and top corner R of the emitting chip 33 delimit the origins of rays that just miss and pass the obstructing corner P of LED package 30. These rays are reflected and propagated so that they end up as a substantially parallel exiting edge ray set designated −α after being refracted by the entry surface 25 and being totally internally reflected by the already derived profile segment CC'. The profile segment EE' is the generalized Cartesian oval providing the reflection of these edge-rays as the rays proceeding downward from profile-segment CC'. Once reflected by the segment EE' of the lower surface 24, the rays propagate upward to be refracted by the profile segment BC' and exit thereby in the collimated beam 40 (see FIG. 2).

Figure 10:
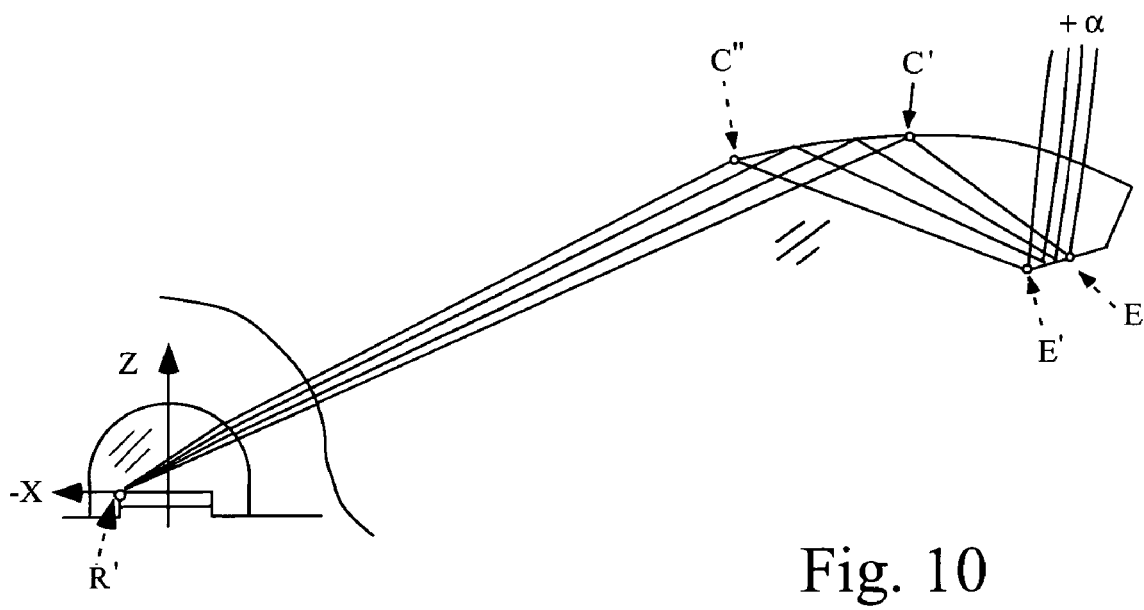
Figure 11:
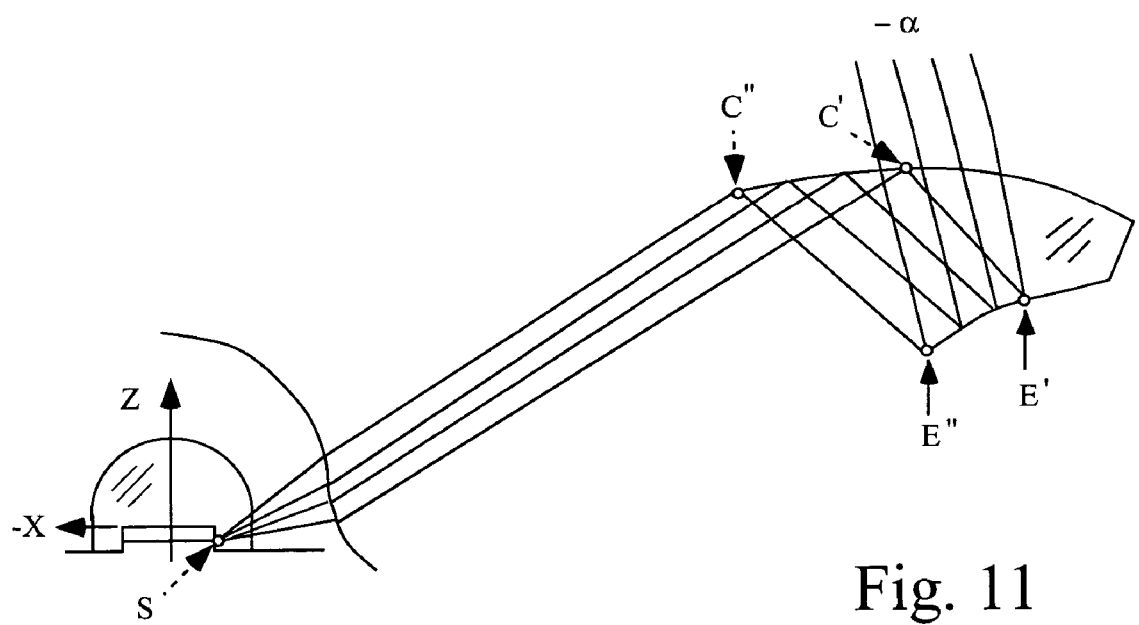

FIGS. 10 and 11 depict the continuation of one embodiment of the method for lens design including the derivation of upper surface profile segment C'C" and lower surface profile segment E'E", respectively. FIG. 10 shows parallel exiting edge rays +α produced from rays originating at the leftmost point R', thereby enabling profile segment C'C" to be mathematically generated. FIG. 11 similarly shows how parallel exiting edge rays −α are used to generate a profile segment E'E". This two step process continues to be repeated inward along the upper surface 23 to complete the derivation of the entire lens profile, as shown in FIG. 2. A width or diameter of a top reflective portion or mirror 22 (see FIG. 2) is further calculated to ensure a metallic reflection when the total internal reflection condition (incidence angle>critical angle) no longer holds. Once the original choice of points M, A, C and Q has been made, the lens profile is generated uniquely, so that it becomes a very means for optimizing the selection of their location. That is to say, numerous candidate lens profiles may be generated from different sets of starting points.

Varying the angle a and the tilting angle γ of a central ray at the exit aperture during the design process results in a nonuniform beam. This beam can be made to obey a particular rotationally symmetric illumination prescription specified by an intensity $I_{OUT}(\theta)$, where θ is an exit emission angle from the optical axis. The integral of $I_{OUT}(\theta)$ over an entire θ-range of the output beam 40 equals the package luminosity less losses incurred by the lens (Fresnel reflectance at entry and exit, surface or volume scattering, and absorption). Substantially any pair of functions α(x) and γ(x) that generate the intensity $I_{OUT}(\theta)$ can be used by the present method to derive upper and lower surface profile heights at each distance x from the central axis. For example, since γ(x)=0 describes the narrowest possible beam, anything wider would use a monotonic γ(x), either diverging (dγ/dx>0) or converging (dγ/dx<0), depending on the desired beam behavior near the lens, whereas in the far-field the resultant will be the same $I_{OUT}(\theta)$.

A lens fulfilling a prescription is the result of generating numerous candidate profiles in a series the ray traces of which converge to the prescription. Initial trials for α(x) and γ(x) use them in the form of polynomials with coefficients adjustable by conventional multiparametric optimization, with repeated trials for fine tuning.

Let β(x) be the angle formed with the optical axis of the meridian central ray $r_m$ emitted from the central point O of the chip cross-section, and which exits the device emitted from the point of the exit aperture at the position x with angle γ(x). The intensity emitted by the chip in direction β is given by:

$$I_{IN}(\beta) = LD(\beta)d, \quad (1)$$

where L is the luminance of the chip (if varying, given by a function L(β), d is the transverse width of the chip's top face, and D(β) is the size of chip's meridian cross-section projected in a plane perpendicular to the ray $r_m$. The function D(β) is given by:

$$D(\beta) = \begin{cases} d\cos\beta + h\sin\beta & \text{if } 0 \leq \beta \leq \frac{\pi}{2} \\ h\sin\beta & \text{if } \frac{\pi}{2} \leq \beta \leq \beta_{MAX}, \end{cases} \quad (2)$$

where h is the chip height (for example, the Luxeon as modeled herein, d=1 mm, h=0.15 mm). The upper expression in Equation (2), has two terms, the first corresponding to the chip's top-face emission and the second to the chip's side emission. In the lower expression, which is for values of β over 90°, there is only side emission (for the Luxeon, $\beta_{MAX}$=100°).

The aforementioned monotonic behavior of a chief ray divergence angle γ(x) allows a monotonic dependence between β and θ. This dependency enables the conservation of flux during the intensity transfer through the lens to be given by the first order optics approximation defined by:

$$\eta_{optics}(\beta) I_{IN}(\beta) d\beta = \pm I_{OUT}(\theta) d\theta, \quad (3)$$

where $\eta_{optics}$ is estimated, taking into account the refraction and metallic reflections along the ray path as a function of central angle β. The ± sign applies to the election of a converging output beam device (+) or a diverging type (−). Integrating both sides of Equation (3), the function β=f(θ) is obtained, where the integration constant is implicit and is fixed by the selection of the contour condition (for instance, β=0 when θ=0).

Because the central ray of the bundle plays the role of the flow line in the nonimaging optics framework in the first order approximation, the etendue conservation states that:

$$2\sin\alpha\cos\gamma\, d\rho = nD(\beta)d\beta = nD(f(\theta))f'(\theta)d\theta, \quad (4)$$

where n is the refractive index surrounding the chip. Taking γ~θ, the following results:

$$2\sin\alpha\, d\rho = \frac{nD(f(\gamma))f'(\gamma)}{\cos\gamma} d\gamma. \qquad (5)$$

Therefore, α(x) can be freely selected (except for singular cases) and γ(x) can be calculated through the integration of Equation (5), or vice versa.

In one embodiment, the apparatus is configured such that the beam is divergent and the tilting angle varies linearly with respect to the distance to the optical axis, which produces an apparent virtual image of the chip behind the optical device (giving the lit appearance of depth). A generic class disclosed herein is that of a folded illumination lens with a refractive entry-surface positioned about, and at least partially surrounding either a light source in the case of illumination lenses or a wide angle light receiver, a role that LEDs can also fulfill.

Figure 12:
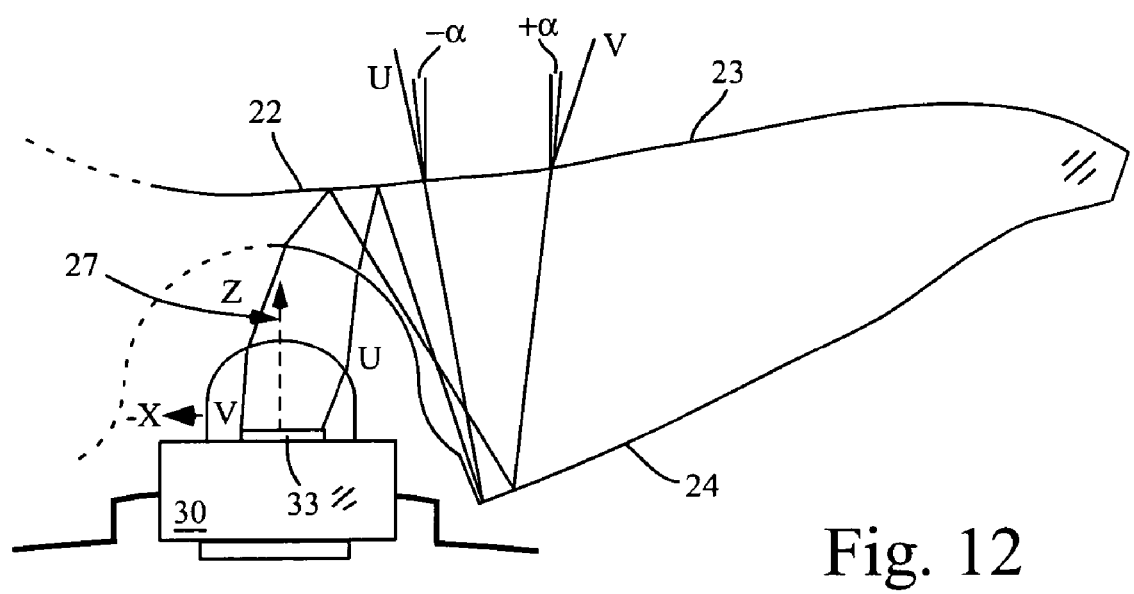

If a function γ=f(θ) is allowed to be non-monotonic, the degrees of freedom increase, since part of the output beam will be diverging while the remainder will be converging. Then α(x), for instance, can be freely selected in the diverging part for example, or γ(x) can be freely selected. The function γ(x) in the converging portion is calculated through the method described above to produce the prescribed intensity $I_{OUT}(\theta)$ minus the intensity produced by the diverging part (which can be computed because α(x) and γ(x) have already been set in the diverging portion). The hemispheric configuration of the entry surface 25 of the cavity 19 is utilized to conform to the hemispheric shape of the light source package 30. FIG. 12 depicts an enlarged portion of a cross-sectional view of a lens 20 positioned proximate a source 30. Generally upward-going rays U and V, emitted from opposite sides of an emitting chip 33, are reflected by central lens portion 22 of the first or upper surface. The rays are then reflected back up by the second or lower surface 24 to egress outside the prescribed collimation angles ±α. If the U and V rays cannot be accurately reflected or other problems result, the central portion 22 can alternatively be configured as a flat and made absorptive. With this absorptive configuration there is no stray light beyond the designated output beam. The absorptive area can be so designed as to have a minimal effect (a few percent) on the efficiency of the device.

Figure 13:
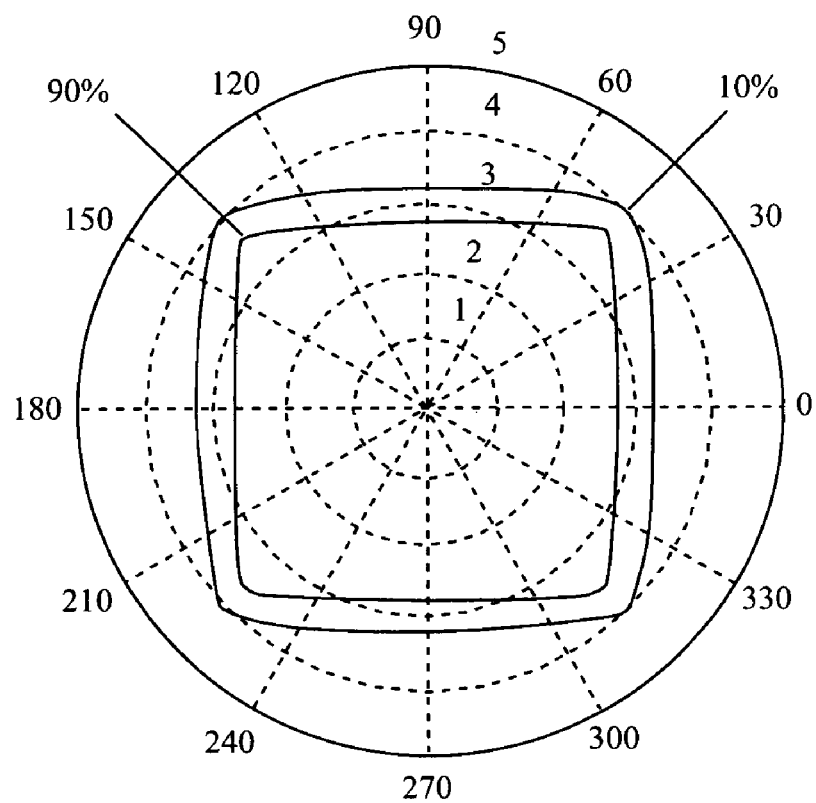
FIG. 13 depicts one example of a photometric output of a lens and light source configuration according to one embodiment of the present invention.

FIG. 13 depicts one example of a photometric output of a lens and light source configuration according to one embodiment of the present invention. The collimation of the produced beam is so tight (i.e., etendue-limited) that the output beam, indicated by 90% and 10% isophotes, has a same square shape as the source.

The present SMS method for numerical lens profile generation provides a list of points (as many as desired) of upper and lower optical surfaces 23 and 24, respectively. In one embodiment, the present invention provides a fitting for the plurality of points with, for instance, a high-degree polynomial that can approximate the lens surface profile data with sufficient accuracy for a more compact surface specification than a mere coordinate list. As the slope errors are optically the most critical, in one embodiment, the present invention minimizes the quadratic slope-error to achieve an accurate fitting. As an example, a best-fit for the aforementioned 35 mm lens design provides the following coefficients, according to the following for top surface:

$$Z = \sum_{i=0}^{n} a_i \cdot x^i;$$

for the bottom surface:

$$Z = \sum_{i=0}^{n} b_i \cdot x^i;$$

and for the entry surface:

$$Z = \sum_{i=0}^{n} c_i \cdot x^i.$$

where $0°=1$ when implementing algorithms expressing this formula. Table 1 shows examples of a plurality of points for top, bottom and entry surfaces.

TABLE 1

| j | $a_j$ Top Surface | $b_j$ Bottom Surface | $c_j$ Entry Surface |
|---|---|---|---|
| 0 | 4.7517143955675234 | −2.37422896547999551 | 3.27943985579559971 |
| 1 | 0.078213913593562695 | 0.0622292951208277545 | −0.0246173121411210616 |
| 2 | −0.0662978742367759943 | −0.0389759664142950712 | −0.0737882797784141786 |
| 3 | 0.0653268361785309115 | 0.0427753804903300075 | −0.0371345035186528491 |
| 4 | −0.028131071797561049 | −0.0165057172583391483 | −0.208828497656781797 |
| 5 | 0.00667342646261397977 | 0.00390454007192048754 | 0.0462095551333369797 |
| 6 | −0.000909090274647977956 | −0.000574432591739397437 | 0.563664059210326585 |
| 7 | 6.53740286835509241e−05 | 4.96008482510230716e−05 | −0.710315520384180776 |
| 8 | −1.71070606076973267e−06 | −1.89908189331935791e−06 | 0.281466616893121468 |
| 9 | 3.69580831889232931e−09 | −4.30655451796882795e−08 | 0.0267283041984665987 |
| 10 | −7.55216398291593744e−09 | 5.60783797629530747e−09 | −0.0433934461104145547 |
| 11 | 5.0798280142263671e−10 | 1.18989177906988579e−10 | 0.00432512014126843966 |
| 12 | 1.03085871377327384e−11 | −2.94224248903500602e−11 | 0.00225536958553495094 |
| 13 | 9.46270040867123034e−14 | 1.29019160003313356e−12 | −0.000173933726991574501 |
| 14 | −9.88694721333669511e−14 | −4.12512389072579956e−14 | −8.12937989966903794e−05 |
| 15 | −7.41902659979368428e−16 | 8.73443199845399005e−16 | −7.14766252067262778e−06 |
| 16 | 3.60491708808995904e−17 | 1.8991224070216625e−16 | 1.20703334148528569e−06 |
| 17 | 1.62842051709098065e−17 | −8.95609052302280274e−18 | 4.98012294447932047e−07 |
| 18 | −8.52526011450971706e−20 | −1.4236964742671865e−19 | 1.31956229687478493e−07 |
| 19 | 5.6513277964315026e−23 | −3.26648998710840134e−20 | 1.02344717808129012e−08 |

TABLE 1-continued

| j | $a_j$ Top Surface | $b_j$ Bottom Surface | $c_j$ Entry Surface |
|---|---|---|---|
| 20 | −2.03202847331993117e−21 | 1.94006021694096199e−21 | −7.71592468451516261e−09 |
| 21 | −9.45109111076399026e−22 | 1.63203403326030414e−23 | −1.15687396744118322e−09 |
| 22 | −5.64169945062607058e−24 | −2.39150069511507584e−24 | −2.27355224407997751e−10 |
| 23 | 7.19729651975731253e−25 | 5.2690516533691285e−25 | 3.58182414730620312e−11 |
| 24 | 1.53396378378546122e−26 | 9.50454763650073265e−27 | 1.14396812818287773e−11 |
| 25 | 9.073506527840067e−28 | −1.69824517836859919e−27 | 1.80840995751385356e−12 |
| 26 | −1.83669245121739288e−28 | −8.11566156767613041e−29 | 3.84529655691247707e−13 |
| 27 | −3.3240050146999732e−30 | 3.5096580735441562e−30 | −4.44916828079620503e−14 |
| 28 | −2.57300919608035131e−31 | −2.95601508863453337e−31 | −1.71901119269923803e−14 |
| 29 | 3.55549030824495442e−32 | 6.18196343723693842e−33 | −6.63206239661835948e−15 |
| 30 | −8.43513155870074496e−34 | 8.25753015594589045e−34 | −5.79336274978293154e−16 |
| 31 | 1.04545916297016553e−34 | 2.79078083511144539e−35 | 7.44350341188460437e−17 |
| 32 | 1.63271306677402734e−36 | 1.36142360482703487e−36 | 6.49464339107313353e−17 |
| 33 | 1.21819065774971929e−37 | −2.30782421623554762e−38 | 1.37977429835118187e−17 |
| 34 | −3.69585808585755392e−38 | −1.2556670208535129e−38 | −9.92758283229503948e−19 |
| 35 | −4.15276497544421456e−40 | 7.32373456569378427e−41 | −3.59739035272194971e−19 |
| 36 | 1.24075605775685041e−41 | −1.7739149903472275e−41 | −1.13116293900756739e−19 |
| 37 | 5.78413135083638718e−42 | 1.20954867838688467e−43 | 1.89020222050207292e−21 |
| 38 | −1.09208941562968013e−43 | 9.60885532478781834e−44 | 5.00935015970486579e−21 |
| 39 | −3.69155144939008431e−45 | 1.06168257852663409e−45 | −1.39039045541811553e−22 |
| 40 | 5.2147664314650947E−47 | 1.42766719428987924E−46 | −3.68639445686684908E−23 |

Figure 14:
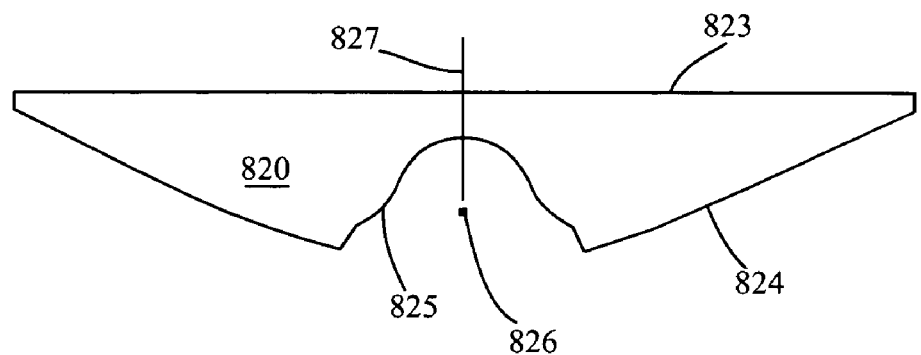
FIG. 14 depicts a simplified cross-sectional view of a lens according to one embodiment of the present invention.

In the explanation above, the central part of the entry surface (from N to the axis) and from A to C on the top surface 23 are typically freely selected. These degrees of freedom come from the fact that the SMS method of the present invention specifies two surfaces. It is possible to fix other surfaces or portions thereof, as in the explanation above. For instance, the top surface 23 can be fixed as flat and the accurate light-folding design of the lens can be carried out through the generation of the entry surface 25 and the reflectively coated bottom lens surface 24. This flat-top case is of interest for some applications, for example, because an array presents a flat appearance. FIG. 14 depicts a simplified cross-sectional view of a lens 820 according to one embodiment of the present invention. The lens 820 is configured with a substantially flat top surface 823. The lens additionally includes a bottom reflector surface 824 and an entry surface 825 designed through the present SMS method where the entry point is positioned about a focal point 826. A central axis 827 is normal to the flat top 823.

Figure 15:
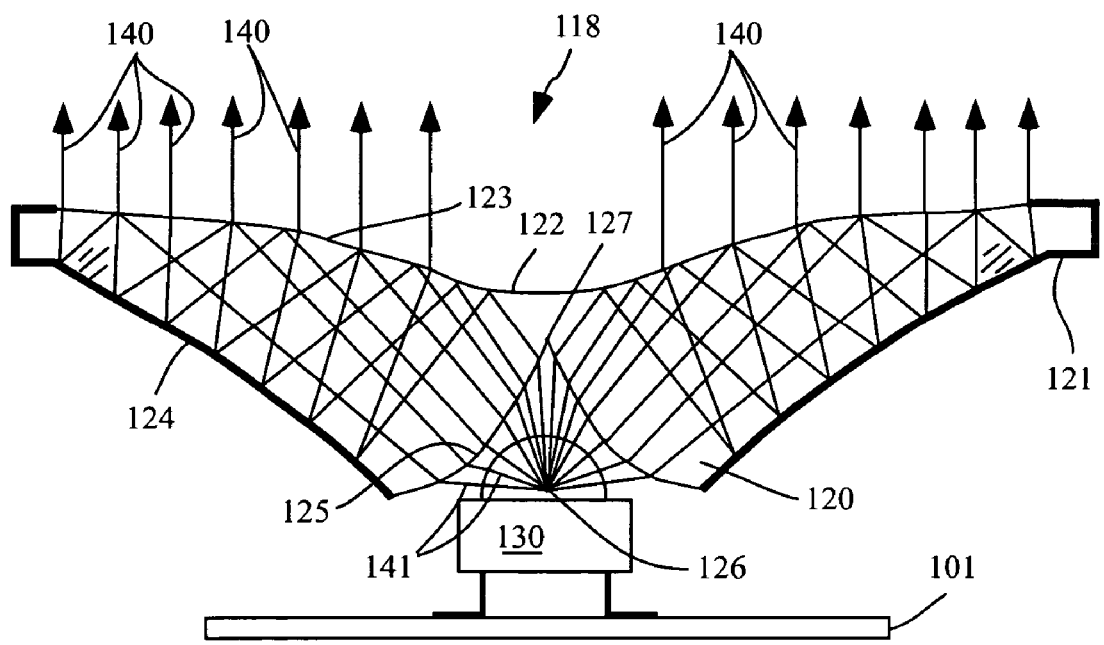
FIG. 15 depicts a simplified cross-sectional view of an RXIR apparatus according to another embodiment of the present invention.

FIG. 15 depicts a simplified cross-sectional view of an RXIR apparatus 118 according to another embodiment of the present invention. The apparatus 118 includes an alternative design for the shape of the entry surface 125. An LED package 130 is mounted on a circuit board 101. The RXIR apparatus 118 includes a collimating lens 120 that is positioned proximate to and at least partially surrounds package 130. The lens 120 has an upper surface comprising reflectively coated central zone 122 and an outer totally internally reflecting zone 123 extending to a mounting flange 121. The lens 120 additionally includes a lower reflecting surface 124 surrounding the cavity 119 formed through the central entry surface 125. The entry surface arches from the lower surface 124 up to a central cuspoid point 127. Output rays 140 originating from the LED positioned at the central focal point 126 exit the lens in a well collimated (though not quite etendue limited) distribution, similar to embodiments of the present invention described in detail above. Originating central rays 141 are refracted more radially by the entry surface 125 so that the rays can be included in the collimated beam.

Figure 16:
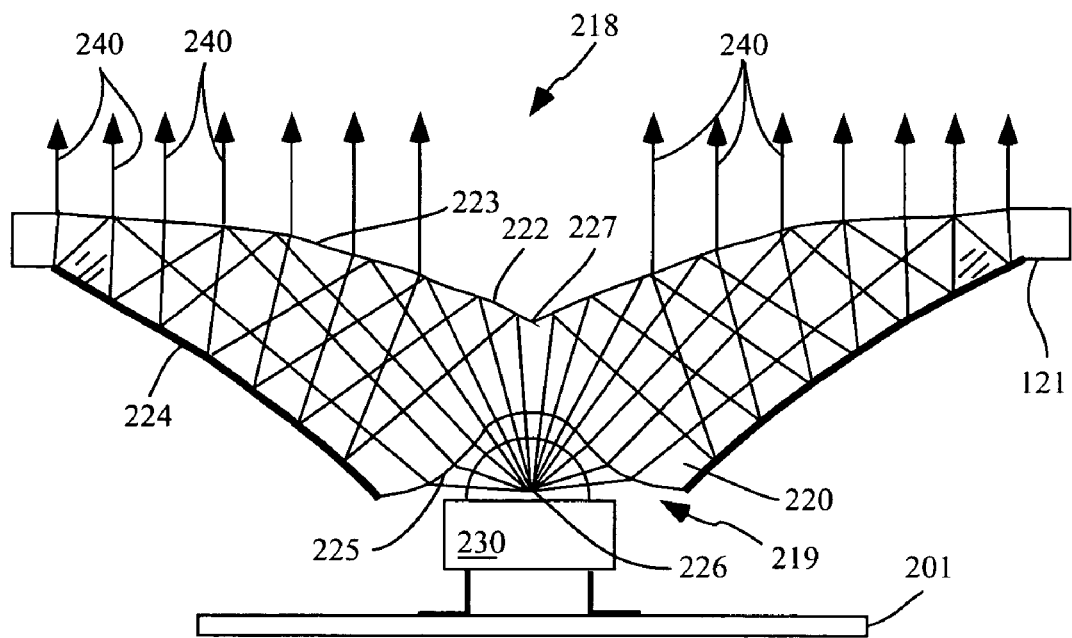
FIG. 16 depicts a simplified cross-sectional view of an RXIR apparatus according to another embodiment of the present invention.

FIG. 16 depicts a simplified cross-sectional view of an RXIR apparatus 218 according to another embodiment of the present invention, one having a similar central-discontinuity strategy as shown in FIG. 16, but applied to the center of the upper surface 222, 223. The lens 220 at least partially surrounds LED and package 230, which is mounted on a circuit board 201. The lens has an upper surface comprising a reflectively coated central zone 222, coming to a cuspoid point at 227, surrounded by totally internally reflecting peripheral surface 223 and extending to mounting flange 221. The lower surface comprises the central cavity 219 with entry-surface 225 and surrounding reflective surface 224, such as a reflectively coated surface and/or a TIR surface. Rays 240 propagate outward from focal point 226 to enter the lens through entry surface 225, to be reflected by the upper surface to reflector 224 to be again reflected, then out the lens through upper surface 223.

Figure 17:
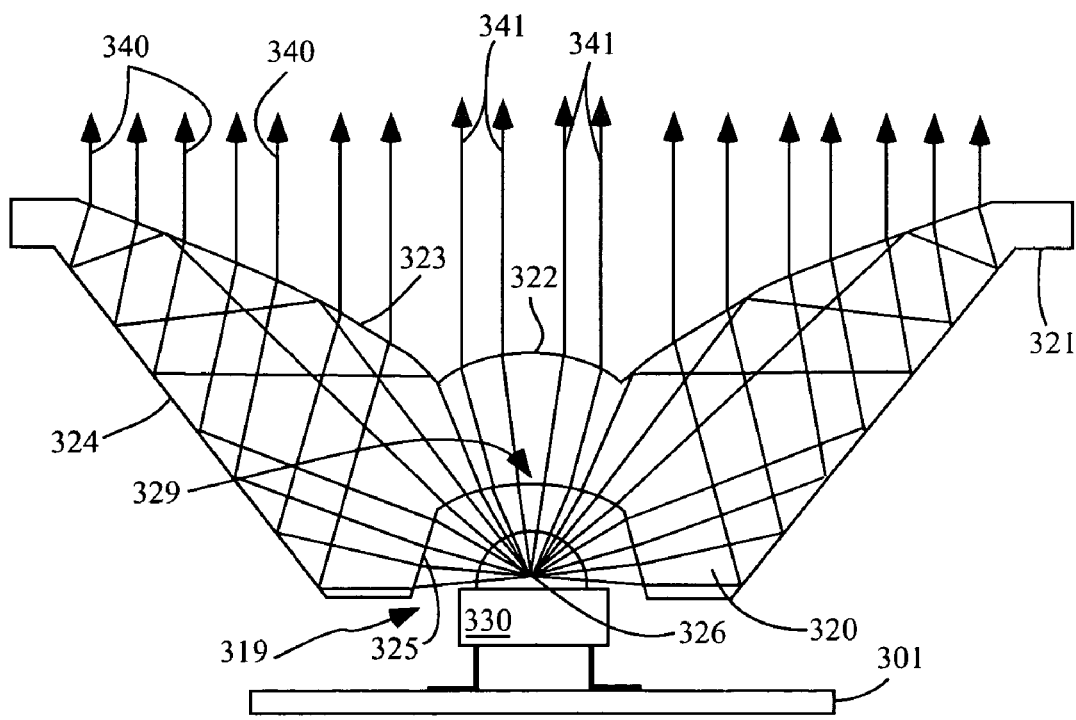
FIG. 17 depicts a simplified cross-sectional view of an RXIR apparatus according to one embodiment of the present invention.

FIG. 17 depicts a simplified cross-sectional view of an RXIR apparatus 320 according to one embodiment of the present invention that is less compact than some embodiments. The lens 320 includes a central refractive lens 322 at a center of the upper surface. Lens 320 is positioned over an LED package 330 that is mounted on a circuit board 301. The lens 320 has an upper surface comprising refractive central zone 322, surrounded by totally internally reflecting peripheral surface 323 and extending to mounting flange 321. The lower surface comprises the central cavity 319 with entry-surface 325 and surrounding reflective surface 324, and in some embodiments this lower surface is approximately conical. In some embodiments, the reflective surface 324 can be implemented as a totally internally reflecting (TIR) surface similar to the TIR surface described above, and/or reflectively coated surface to provide reflection. Collimated Rays 340 originally propagate outward from the LED at the focal point 326 to enter the lens through entry surface 325. An outermost portion or percentage of the originating rays are totally internally reflected by surface 323 down to reflector 324 to be further reflected out the lens through upper surface 323. Central lens 322 acts in concert with a central upper part 329 of the entry surface 325 to form inner beams 341. This differs from some other embodiments wherein there was a central blank zone in their near-field annular beams. Central beam 341 has a greater beam width than the main-beam rays 340, due to the smaller etendue-limiting diameter of central lens 322.

The present invention can additionally be utilized with other light sources, such as incandescent sources. In some embodiments of the present invention the lens can be molded of glass, with a distinctive central cavity being a through hole. In some embodiments the central cavity is formed as a cylindrical hole that can enclose a tubular incandescent source.

Figure 18:
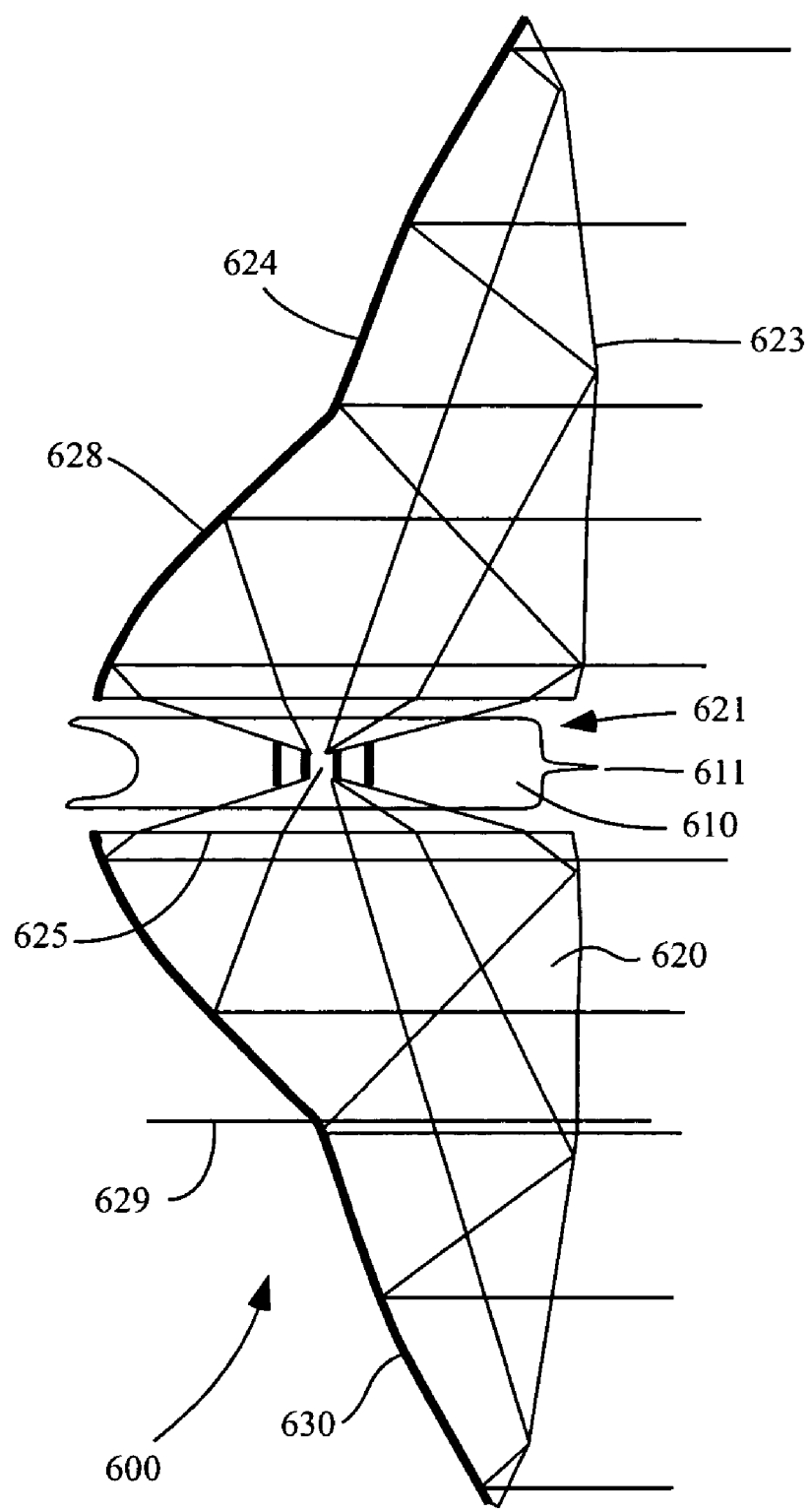
FIG. 18 depicts a simplified cross-sectional view of a light folding and collimating apparatus according to one embodiment of the present invention.

FIG. 18 depicts a simplified cross-sectional view of a light folding and collimating apparatus 600 according to one embodiment of the present invention. The apparatus 600 can be utilized as a headlamp or other light source. The apparatus includes a lens 620 that can be generated or implemented in glass. The apparatus 600 comprises a light source 610 (e.g., incandescent lamp) with end nub 611, the glass lens 620 with a central hole or channel 621 formed by a generally cylindrical entry surface 625. The lens is positioned such that the source 610 is positioned within the central hole 621 such that the entry surface circumferentially surrounds the source 610. The lens 620 has a mirror-coated rear surface 624 and front surface 623. An axis indicated generally by line 629 divides the rear reflecting surface 624 into a central, inner quasi-parabolic section 628 and outer SMS-designed surface 630. Thus, the apparatus 600 utilizes a biform lens that has a more compact profile than a conventional full parabola, and provides better collimation. The quasi-parabolic section 628 performs well as an inner collimator of originally rearward rays, see FIG. 18.

Figure 19:
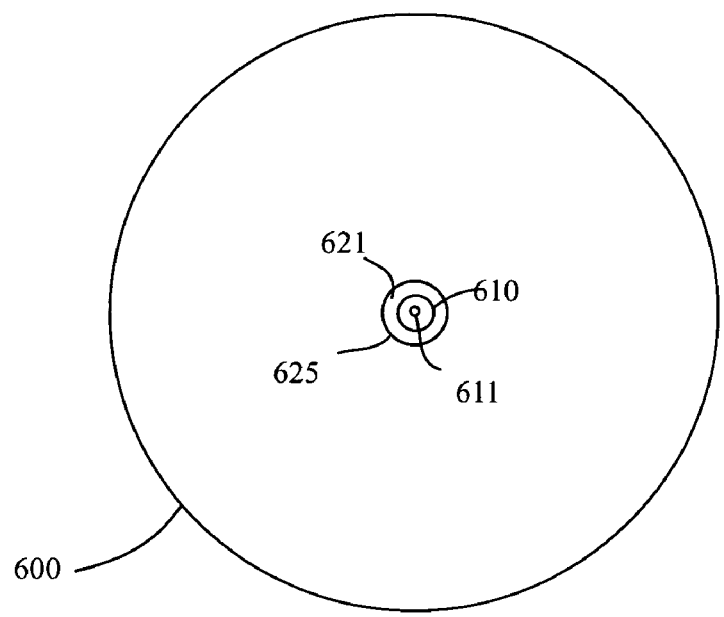
FIG. 19 shows a simplified elevated front view of the optical apparatus depicted in FIG. 18.

FIG. 19 shows a simplified elevated front view of the optical apparatus 600 depicted in FIG. 18. The central hole 621 surrounds the source 610, which is sealed at a central end-nub 611. The optical significance of this feature is that it scatters enough light to be visible outside the main beam.

Figure 20:
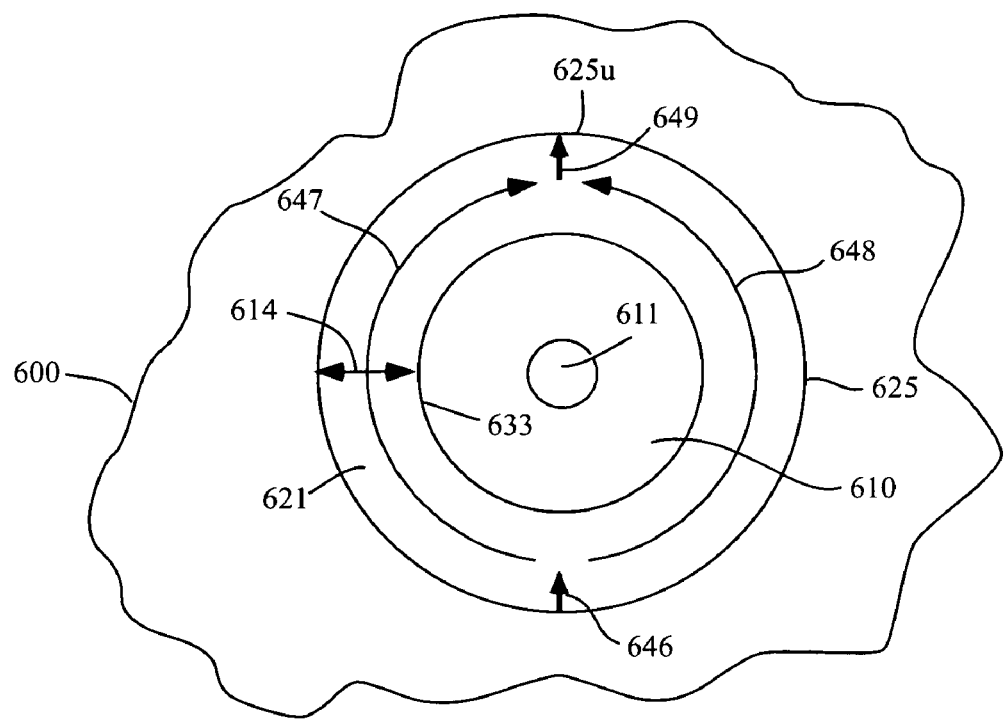
FIG. 20 is a central magnified front view of the apparatus shown in FIGS. 18 and 19.

FIG. 20 is a central close-up or magnified front view of the apparatus 600 shown in FIGS. 18 and 19. The central tubular hole 621 encloses the incandescent lamp 610, with the end-nub 611 also shown. In some embodiments, the design diameter of the lamp 610 is determined by the limiting temperature of its glass envelope. The central hole 621 is configured to allow a minimum clearance over the diameter of lamp 610, preventing excess heat from conducted across a gap 614. Further, the gap 641 can be configured to establish a natural convection current. For example, the gap can be greater than 2 mm, preferably greater than 5 mm. The convective current consists of rising air 646 coming in from the front or rear of hole 621, left-side air-current 647 and right-side air-current 648, both of which join into resultant current 649, which then flows out of the plane of FIG. 20, along surface 625u and exiting out of the front or rear of hole 621.

Figure 21:
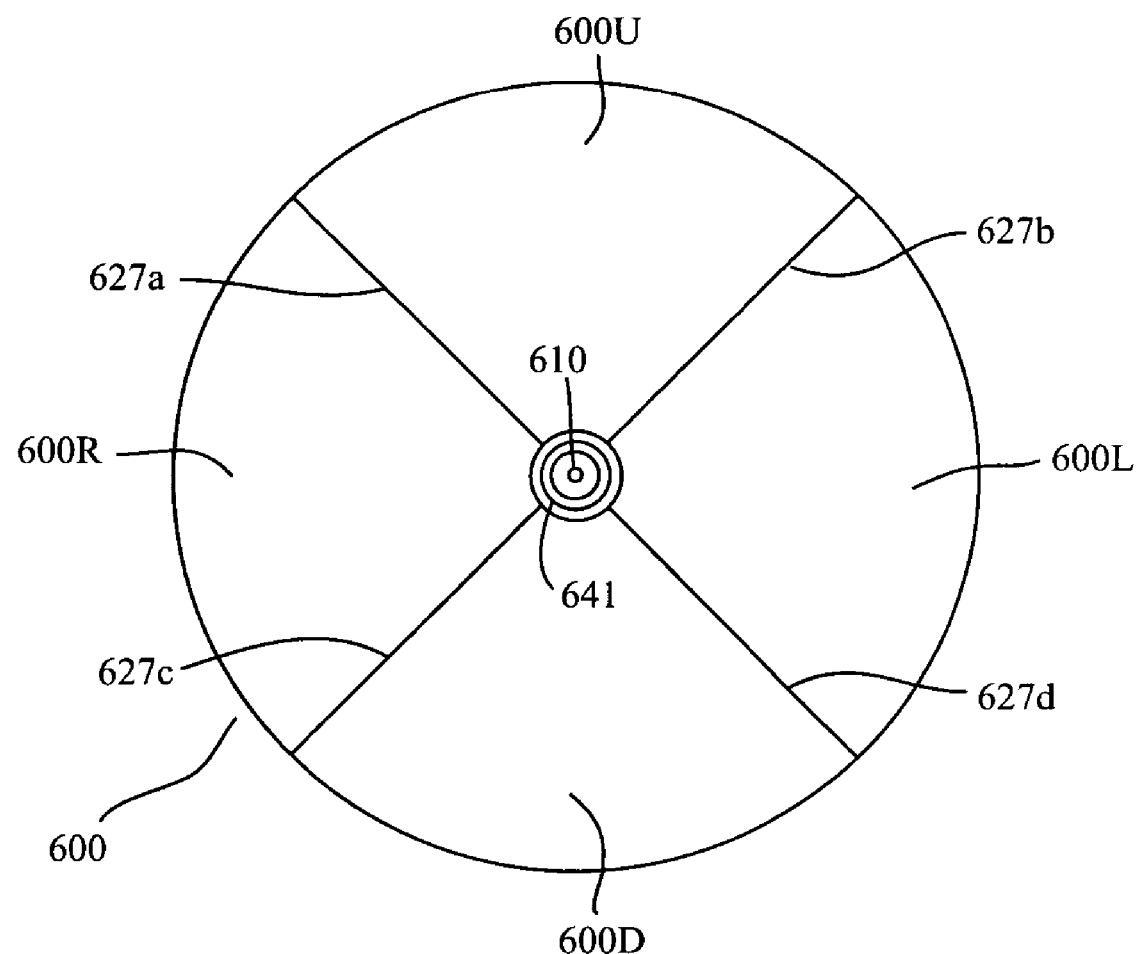
FIG. 21 shows a simplified elevated front view of a lens having a plurality of non-symmetric portions.

In some embodiments, an output pattern is configured to depart from a rotational symmetry in order to fulfill rotationally non-symmetric illumination prescriptions, such as legal illumination prescriptions for automobile headlights. In one embodiment the lens, and thus the headlamp, is segmented into a plurality of portions or pieces, for example four quadrants. Each portion is configured to have a slightly different rotationally symmetric lens. The differences can be implemented being in the back surfaces. FIG. 21 shows a simplified elevated front view of a lens 600 having a plurality of non-symmetric portions. The lens comprises an upper quadrant 600U, lower quadrant 600D, left quadrant 600L (shown on the right, but left in some implementations, e.g., for a headlamp of a car), and right quadrant 600R. Each quadrant has a slightly different front surface shape but a common central air gap 641. These shapes were configured by limiting or clamping the SMS method of the present invention to the same rear-mirror surface.

In one embodiment, the mold for producing this lens is preferentially assembled from quadrants cut out of differently machined front surfaces, which are then blended in a final polishing stage that eliminates any ridges or cliffs that might disturb the molding of the glass. The interfaces are replacing with radial ridges or bumps 627a, 627b, 627c, and 627d. The resultant lens 600 has a rotationally non-symmetric candlepower pattern, closely approximating a specified pattern. In one embodiment, the molds for right and left headlamps differ so as to produce lenses with bilaterally asymmetric distributions that are mirror images of each other, should this capability be desired.

The present invention can be utilized to substitute LED-based spotlights for spotlights utilizing small incandescent lamps. For large incandescent lamps, moreover, glass versions of the present invention can be configured, where some embodiments have been disclosed. The present invention provides compact lenses and methods of determining lens configurations that utilize at least three optically active surfaces to form a well defined narrow-angle output beam, either collimated or having a prescribed intensity profile. The lens is specified by the radial cross-sections of its surfaces, but azimuthal variation of this profile can fulfill asymmetric prescriptions. The present apparatus improves optical signal transmission and/or collimation over immersive folded optics of previous devices.

While the invention herein disclosed has been described by means of specific embodiments and applications thereof, numerous modifications and variations could be made thereto by those skilled in the art without departing from the scope of the invention set forth in the claims.

What is claimed is:

1. A method of manufacturing an optical device, comprising:
   generating a two-dimensional representation of at least three active optical surfaces of an optical device, comprising:
   defining a perimeter;
   calculating a segment of a first surface, an entry surface and a second surface based on an edge ray set according to generalized Cartesian ovals; and
   successively repeating the steps of calculating the segments of the first and second surface; and
   rotationally sweeping the two-dimensional representation about a central axis providing a three-dimensional representation of optical device; and utilizing the three-dimensional representation to make the optical device.

2. The method of claim 1, wherein the calculating further comprises:
   calculating a segment of the first surface based on edge ray set as a first generalized Cartesian oval;
   calculating a segment of the entry surface based on the edge ray set as a second generalized Cartesian oval; and
   calculating a segment of the second surface based on the edge ray set as a third generalized Cartesian oval.

3. The method of claim 2, wherein the calculating the segment of the second surface comprises calculating the segment of the second surface such that the second surface is totally internally reflective.

4. The method of claim 3, wherein the step of calculating the segment of the entry surface includes determining a position of a first end of the segment of the entry surface including the steps of:
   determining a flux weighting for edge rays intercepting the first segment of the entry surface;
   determining a flux weighting for all edge rays of the edge ray sets; and determining a resultant sum of the flex weighting for the edge rays intercepting the first segment of the entry surface as a fraction of the flux weighting for all the edge-rays of the edge ray sets.

5. The method of claim 3, wherein the successively repeating the calculating the segment of the first surface comprises calculating a second segment of the first surface as a fourth generalized Cartesian oval based on a far edge ray set; and wherein the calculating the second segment of the first surface comprises calculating the second segment such that the far edge ray set intercepts the perimeter segment of the second surface after reflecting from the second segment of the first surface.

6. The method of claim 1, further comprising:

molding material to have dimensions equal to the three-dimensional representation of the optical device.

7. A method of designing an optical device, comprising:

generating a two-dimensional representation of at least three active optical surfaces of an optical device, comprising:

defining a perimeter;

calculating a segment of a first surface, an entry surface and a second surface based on an edge ray set according to generalized Cartesian ovals; and successively repeating the steps of calculating the segments of the first and second surface; and rotationally sweeping the two-dimensional representation about a central axis providing a three-dimensional representation of the optical device; and utilizing the three-dimensional representation to make the optical device.

8. The method of claim 7, wherein the calculating further comprises:

calculating a segment of the first surface based on edge ray set as a first generalized Cartesian oval;

calculating a segment of the entry surface based on the edge ray set as a second generalized Cartesian oval; and calculating a segment of the second surface based on the edge ray set as a third generalized Cartesian oval.

9. The method of claim 8, wherein the calculating the segment of the second surface comprises calculating the segment of the second surface such that the second surface is totally internally reflective.

10. The method of claim 9, wherein the step of calculating the segment of the entry surface includes determining a position of a first end of the segment of the entry surface including the steps of:

determining a flux weighting for edge rays intercepting the first segment of the entry surface;

determining a flux weighting for all edge rays of the edge ray sets; and determining a resultant sum of the flex weighting for the edge rays intercepting the first segment of the entry surface as a fraction of the flux weighting for all the edge-rays of the edge ray sets.

11. The method of claim 9, wherein the successively repeating the calculating the segment of the first surface comprises calculating a second segment of the first surface as a fourth generalized Cartesian oval based on a far edge ray set; and wherein the calculating the second segment of the first surface comprises calculating the second segment such that the far edge ray set intercepts the perimeter segment of the second surface after reflecting from the second segment of the first surface.

* * * * *